United States Patent
Lawson

(10) Patent No.: US 12,452,401 B1
(45) Date of Patent: Oct. 21, 2025

(54) SYSTEM AND METHOD FOR MEASURING VIEWPOINT FIDELITY IN HEAD MOUNTED DISPLAY

(71) Applicant: TRU Simulation + Training, Lutz, FL (US)

(72) Inventor: Matthew Edward Lawson, Wesley Chapel, FL (US)

(73) Assignee: TRU SIMULATION + TRAINING, Lutz, FL (US)

( * ) Notice: Subject to any disclaimer, the term of this patent is extended or adjusted under 35 U.S.C. 154(b) by 0 days.

(21) Appl. No.: 18/890,477

(22) Filed: Sep. 19, 2024

(51) Int. Cl.
- *H04N 13/00* (2018.01)
- *G06F 3/14* (2006.01)
- *H04N 13/324* (2018.01)
- *H04N 13/373* (2018.01)
- *H04N 13/376* (2018.01)
- *H04N 13/378* (2018.01)
- *H04N 13/398* (2018.01)

(52) U.S. Cl.
CPC ......... *H04N 13/378* (2018.05); *G06F 3/1423* (2013.01); *H04N 13/324* (2018.05); *H04N 13/373* (2018.05); *H04N 13/376* (2018.05); *H04N 13/398* (2018.05)

(58) Field of Classification Search
CPC .. H04N 13/378; H04N 13/324; H04N 13/373; H04N 13/376; H04N 13/398; G06F 3/1423
See application file for complete search history.

(56) References Cited

U.S. PATENT DOCUMENTS

| | | | | |
|---|---|---|---|---|
| 4,907,296 A * | 3/1990 | Blecha | A42B 3/042 | 2/6.2 |
| 5,856,811 A * | 1/1999 | Shih | G02B 27/0176 | 345/8 |
| 11,520,142 B1 * | 12/2022 | Lu | G02B 27/0093 | |
| 11,762,455 B2 * | 9/2023 | Sinay | G06F 3/011 | 345/8 |
| 2014/0146153 A1 * | 5/2014 | Birnkrant | H04N 7/18 | 348/77 |
| 2015/0009550 A1 * | 1/2015 | Misago | G02B 26/023 | 359/205.1 |
| 2016/0225192 A1 * | 8/2016 | Jones | G06F 3/017 | |
| 2017/0007351 A1 * | 1/2017 | Yu | G02B 27/0172 | |
| 2017/0099479 A1 * | 4/2017 | Browd | G06F 3/011 | |

(Continued)

*Primary Examiner* — Frank F Huang
(74) *Attorney, Agent, or Firm* — SLATER MATSIL, LLP

(57) ABSTRACT

Example methods, apparatuses, and computer-readable media are provided. Example methods include generating a virtual environment including a first shape and a second shape in a virtual viewpoint, the first shape in front of the second shape. The second shape adjusts as the virtual viewpoint adjusts, and is offset from the first shape along a test axis. The first shape is affixed to the virtual viewpoint. The virtual viewpoint is configured to adjust in response to movement of a HMD. The method includes moving a position of the virtual viewpoint with respect to the second shape in response to the movement. The method includes recording reference data associated with moving of the position of the virtual viewpoint. The method includes generating a positional displacement vector by comparing reference data of the second shape with reference data of the first shape, and determining a HMD movement tracking error based on the vector.

20 Claims, 12 Drawing Sheets

(56) References Cited

U.S. PATENT DOCUMENTS

| | | | |
|---|---|---|---|
| 2017/0181802 A1* | 6/2017 | Sachs | B25J 9/108 |
| 2017/0322410 A1* | 11/2017 | Watson | G06T 19/006 |
| 2018/0012413 A1* | 1/2018 | Jones | G06F 3/0346 |
| 2019/0254754 A1* | 8/2019 | Johnson | A61B 34/76 |
| 2020/0117025 A1* | 4/2020 | Sauer | G02C 9/00 |
| 2020/0330179 A1* | 10/2020 | Ton | G02C 7/088 |
| 2020/0410746 A1* | 12/2020 | Shin | H04N 13/383 |
| 2021/0067764 A1* | 3/2021 | Shau | A61B 90/361 |
| 2022/0021867 A1* | 1/2022 | Nouri | G06F 3/013 |
| 2022/0404907 A1* | 12/2022 | Rubin | G06T 19/00 |
| 2025/0008076 A1* | 1/2025 | Saini | H04N 13/327 |

\* cited by examiner

SYSTEM AND METHOD FOR MEASURING VIEWPOINT FIDELITY IN HEAD MOUNTED DISPLAY

TECHNICAL FIELD

The present invention relates generally to measuring viewpoint fidelity in a head mounted display, and in particular embodiments, to testing viewpoint fidelity of a flight simulation involving a head mounted display.

BACKGROUND

Flight simulator testing technology has evolved with the incorporation of head-mounted displays (HMDs), bringing new challenges and opportunities for creating immersive training environments. Such simulations involve a blend of sophisticated hardware and software solutions to ensure a realistic and effective simulation experience.

At the core of these systems are advanced motion facilitating and tracking technologies, including the use of such technologies to provide the realistic output for displaying to the HMD and otherwise. Such technologies typically combine optical systems using cameras and sensors with inertial measurement units, providing precise head position and orientation data. This tracking is crucial for rendering accurate visuals in the HMD as the user moves within an apparatus.

Determining the accuracy of a viewpoint associated with an apparatus, however, has remained challenging to ensure that such simulations remain sufficiently accurate for acceptable level of realistic simulating. Embodiments of the present disclosure include methods, devices, and non-transitory computer-readable storage media that utilize particular elements to overcome these challenges to measure viewpoint fidelity in a head mounted display to determine or test HMD error(s) in one or more test directions.

SUMMARY OF THE INVENTION

Technical advantages are generally achieved by embodiments of this disclosure which describe measuring viewpoint fidelity in a head mounted display.

In accordance with a first aspect of the disclosure, a method is provided. An example method includes generating a virtual environment comprising at least a first shape and a second shape in a virtual viewpoint. The first shape is in front of the virtual viewpoint and is configured to adjust as the virtual viewpoint adjusts. The second shape is at a determined offset from the second shape in a test axis and affixed in the virtual environment. The virtual viewpoint of the virtual environment is configured to shift in response to movement of a head mounted display (HMD) on a test stand. The example method further includes causing outputting of the virtual environment to the head mounted display. The example method further includes moving a position of the second shape in the virtual environment in response to the movement of the HMD on the test stand. The example method further includes recording reference data of the second shape indicating at least a center position of the second shape. The example method further includes generating a positional displacement vector by at least comparing the reference data of the first shape with reference data of the second shape. The example method further includes determining a HMD movement tracking error based on the positional displacement vector.

In some embodiments, the example method further includes determining a test result based on the HMD movement tracking error. The example method further includes outputting the test result.

In some embodiments, the example method further includes determining that the HMD movement tracking error is within a threshold, where the test result is a test successful result.

In some embodiments, the threshold comprises 2 inches.

In some embodiments, the example method further includes detecting a test completion trigger, where determining the test result is in response to the detecting of the test completion trigger.

In some embodiments, the example method further includes generating at least one orientation displacement angle by at least comparing the reference data of the first shape with reference data of the second shape. The example method further includes determining a HMD orientation tracking error based on the at least one orientation displacement angle.

In some embodiments, the example method further includes determining a test result based on the HMD orientation tracking error. The example method further includes outputting the test result.

In some embodiments, the example method further includes determining that the HMD orientation tracking error is within a threshold, where the test result is a test successful result.

In some embodiments, the threshold comprises 5 degrees.

In some embodiments, the example method further includes generating the virtual environment comprising a third shape that blocks at least a portion of the virtual environment from rendering in the virtual viewpoint.

In some embodiments, the example method further includes causing outputting of the virtual environment to an additional display.

In some embodiments, the example method further includes causing outputting of the virtual environment to a second additional display.

In some embodiments, the first shape comprises a first circular shape with a first at least one cutout, and the second shape comprises a second circular shape with a second at least one cutout.

In some embodiments, the example method further includes for each additional test axis of at least one additional test axis: moving the position of the second shape in the virtual environment in response to the movement of the HMD on the test stand along the additional test axis, recording second reference data of the second shape indicating at least the center position of the second shape, generating an additional positional displacement vector by at least comparing the additional reference data of the first shape with additional reference data of the second shape, and determining an additional HMD movement tracking error based on the additional positional displacement vector, wherein the additional HMD movement tracking error is associated with the additional test axis.

In some embodiments, the test stand is fixedly moveable only along the test axis.

In some embodiments, the first shape is of a first color and the second shape is of a second color, wherein the first color and the second color are visually distinguishable.

In accordance with a second aspect of the disclosure, an apparatus is provided. An example apparatus includes at least one processor. The example apparatus includes at least one non-transitory computer readable memory connected to the at least one processor and including computer program code. The at least one non-transitory computer readable memory and the computer program code are configured, with the at least one processor, to cause the apparatus to perform the example method in accordance with any one of the example methods described herein.

In accordance with a third aspect of the disclosure, at least one non-transitory computer-readable storage medium is provided. An example at least one non-transitory computer-readable storage medium has computer program instructions stored thereon that, when executed by at least one processor, causes the at least one processor to perform the example method in accordance with any one of the example methods described herein.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
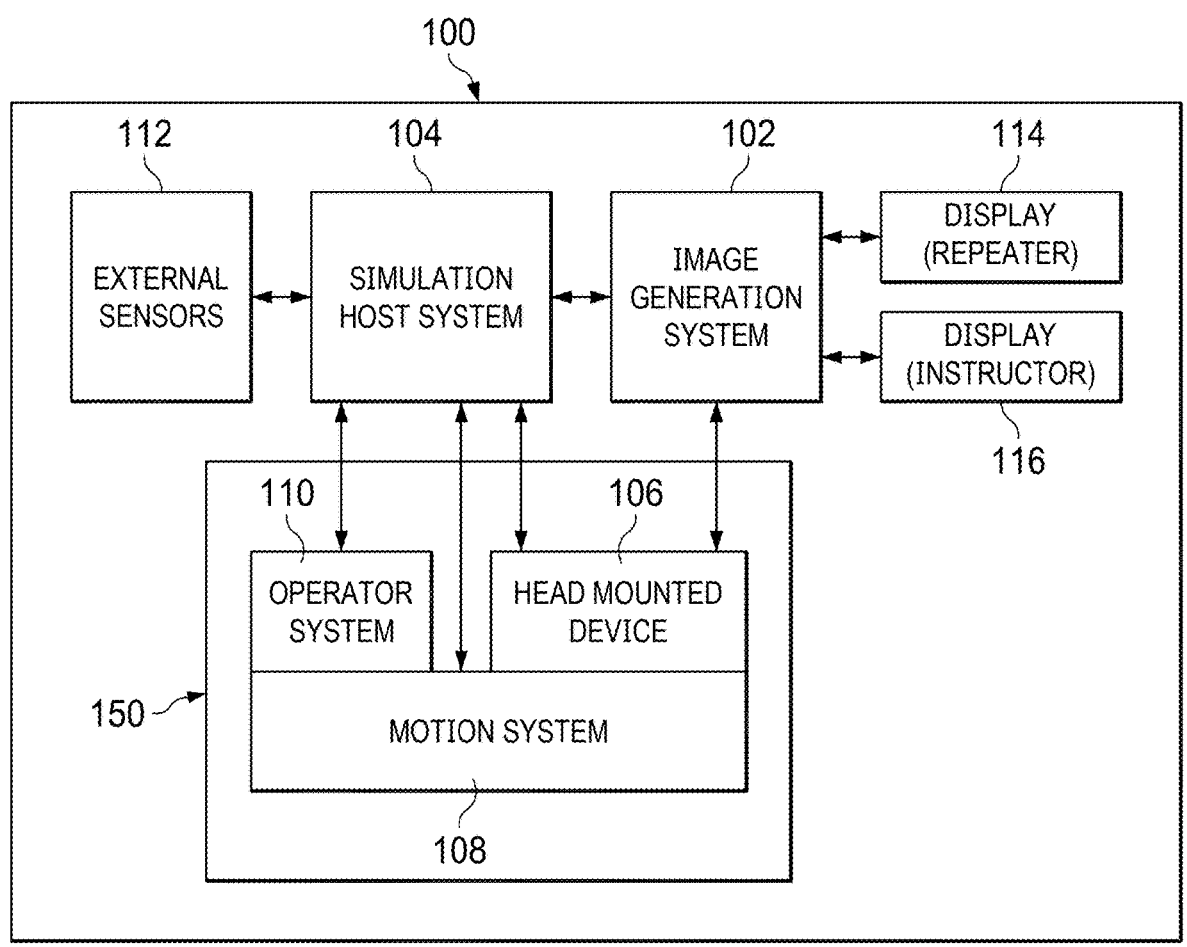
FIG. 1 illustrates a block diagram for an example system in accordance with at least one aspect of the disclosure.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions, or alterations can be made herein without departing from the spirit and scope of this disclosure as defined by the appended claims.

Technical Understanding and Advantages

Simulating a virtual environment involves generating and depicting virtualized versions of real-world objects, items, and environments that are output to a display for depicting to a user. A head mounted display (HMD) may be utilized by a user to provide realistic input/output to a display, or otherwise immerse a user in the simulation to provide a more realistic simulation experience. For example, the HMD may be worn by the user such that as the user performs a movement (e.g., rotates or otherwise repositions their head), a viewpoint of a virtual environment that is displayed is updated based on the movement performed.

In various contexts, including simulation of vehicle movements such as aerial vehicles, additional specialized hardware or software components may be utilized for any of a myriad of purposes. Particular hardware or software components in some contexts are provided that match real-world controls of the particular context. For example, in one such context where a simulation is provided for controlling a particular aerial vehicle (e.g., a flight simulator for training a pilot on a particular aerial vehicle), specialized hardware that matches the exact controls of the particular aerial vehicle may be provided as part of the simulation/testing apparatus. The simulation apparatus may also include a motion cueing system (also referred to as a "motion system") that manipulates the user within the apparatus. For example, a motion cueing system may affect the simulation apparatus to simulate movement effects based on the inputs provided by the user through any of a myriad of controls, such as movements in any one or more of 6 degrees of freedom or combination thereof, vibrational effects, or other felt stimuli. In certain contexts, such as using a simulation apparatus to simulate piloting a particular aerial vehicle during training of a pilot for that aerial vehicle, maintaining a realistic virtual environment and viewpoint is particularly desirable to ensure that the training performed will accurately map to the pilot's real-world experience in controlling the particular aerial vehicle.

At any given time, use of a simulation apparatus may deviate from sufficiently accurately depicting a realistic simulation experience for any of a myriad of reasons. In some circumstances, a HMD may be impacted by one or more deficiencies that cause errors in depicting a virtual viewpoint that accurately mirrors movement of the HMD. For example, one or more components of an HMD may be deficient or operating in a poor condition, such that the resulting data from the component that is utilized to generate or otherwise configure the virtual viewpoint of the virtual environment is inaccurate. Measuring and testing for the accuracy and sufficiency of a simulation apparatus, however, remains difficult, as performing such measuring and testing should be performed with objective and comparable data across a temporal quality of the simulation apparatus supporting such virtual reality capabilities.

Measuring viewpoint fidelity (e.g., a quality of realism and accurate reflection of movement of a simulation apparatus) is desirable to avoid introduction of negative effects to a user when outputting a virtual viewpoint of a virtual environment, for example to a display of a HMD worn by the user. In this regard, a test procedure may be desirable for use in determining what, if any, errors are present in operation of an HMD associated with a simulation apparatus, as well as whether such errors are within acceptable thresholds for realistic operation. Such a test procedure includes use of the simulation apparatus and related virtual viewpoints outputted in accordance with the simulation to perform one or more defined procedures that indicate whether virtual viewpoint movements accurately reflect corresponding HMD movements effectuated via the simulation apparatus. In this regard, such test procedures measure such errors between the viewpoint movements and corresponding HMD movements, and in some embodiments indicate whether the movement effects on the HMD are within thresholds that indicate whether the errors may negatively impact the simulation operation to a level that is not acceptable for realistic use, may cause negative effects on the wearer of the HMD, or cause other undesired effects in performing a realistic virtual simulation.

Embodiments of the disclosure include particular methods, apparatuses, and non-transitory computer readable storage media for measuring viewpoint fidelity in a HMD, or testing whether viewpoint fidelity satisfies one or more thresholds. In this regard, such procedures in some embodiments provide a virtualized simulation environment that includes specially configured elements utilized to perform such measuring. The specially configured elements may be updated as described herein as one or more inputs are received, for example via a simulation apparatus, where the specially configured elements updates in configuring such elements enables objective and comparable data measuring.

Some embodiments, for example, generate a virtual environment that includes at least a first shape and a second shape in a virtual viewpoint. The first shape is in front of the second shape within the virtual viewpoint. The second shape is configured to adjust in the virtual viewpoint as the virtual viewpoint adjusts. In this regard, the second shape may move its position within the virtual viewpoint as an input adjusting the virtual viewpoint is received, for example based on movements of an associated HMD that controls movements of the virtual viewpoint in the virtual environment. The first shape is affixed in the virtual viewpoint of the virtual environment, such that the first shape is specially configured to remain in a set position as the virtual viewpoint is adjusted (e.g., via movement of a HMD).

The virtual viewpoint of the virtual environment is configured to adjust in response to movement of the HMD. For example, the virtual viewpoint may be updated as a rotation or translation is applied to a virtual camera in the virtual environment, where the virtual camera captures the virtual viewpoint. The movement of the virtual viewpoint may be based on HMD spatial position data that is received from the HMD. For example, the HMD spatial position data may be data that is captured by one or more sensors of the HMD, one or more external sensors associated with monitoring the HMD, or any combination thereof, and such data represents the movement of the HMD along the test axis as a motion is performed.

In some embodiments the HMD is mounted to or otherwise secured to a test stand. The test stand may be configured to move (e.g., during a user-initiated manual motion applied to the test stand or a motion cue via a motion cueing system) in any desired manner, for example in any one of 6 possible degrees of freedom. The test stand may be locked for movement only along a particular test axis. By being secured to the test stand, the HMD may have its position or orientation adjusted together with the test stand, thus providing updated input data for updating a virtual viewpoint of the virtual environment or one or more elements of the virtual environment associated with the virtual environment, for example the first shape affixed to the virtual viewpoint. For example, in some embodiments the test stand is moved along a particular test axis to an excursion value, and the virtual viewpoint is updated within the virtual environment together with the first shape that is affixed to the virtual viewpoint. In this regard, the first shape may remain in the same place of the virtual viewpoint, for example such that the first shape is centered within the virtual viewpoint regardless of the movement of the virtual viewpoint within the virtual environment.

Some embodiments further move a position of the virtual viewpoint with respect to the second shape in response to movement of the HMD on the test stand. For example, in some embodiments, a test operator initiates a movement of the test stand to an excursion value along a test axis, or a movement from the excursion value to a neutral value along the test axis. The neutral value may represent a default position along a test axis where the test stand is oriented (e.g., a "forward facing" position). The excursion value may represent a value along the test axis to which the test stand is moved (e.g., rotated, traversed, re-oriented, or the like). A first movement may be a movement from the neutral value to the excursion value as the test stand is manipulated to a test point. The test point, located at the excursion value along the test axis, may correspond to the determined offset at which a second shape in the virtual environment is offset from a first shape. During testing of a particular test axis, the test stand may be in a locked configuration to move only along that particular test axis.

Optionally, in some embodiments, a motion cueing system triggers movement of the test stand to a particular excursion value. In some embodiments, positioning information may be monitored associated with the movement, or is received from the motion cueing system that represents the initiated movement. Some embodiments generate controls corresponding to the positioning information, for example to trigger the motion cueing system to initiate the movement to the particular excursion value.

Some embodiments record reference data of one or more of the shapes in the virtual viewpoint. For example, in some embodiments, reference data associated with the moving of the position of the virtual viewpoint is recorded. In some embodiments, reference data including at least one reference position of a first shape is recorded at one or more times, where a portion of the reference data indicates at least a reference position of the first shape at a particular point in time. The reference position may be the position of a particular reference point on or associated with the first shape at the particular point in time. Additionally or alternatively, in some embodiments, reference data associated with the second shape is recorded at one or more times, where a portion of the reference data indicates a reference position of the second shape at a particular point in time. The reference position may be the position of a particular reference point on or associated with the second shape at the particular point in time. In some embodiments, only reference data associated with one of the shapes is recorded, as the reference data of the other shape may be predetermined or known, for example based on the affixed reference point of the shape (e.g., the virtual environment within which the second shape is affixed, or the virtual viewpoint of the virtual environment to which the first shape is affixed).

Some embodiments generate a positional displacement vector. The positional displacement vector is generated by at least comparing the reference data of the second shape with reference data of the first shape. In this regard, the positional displacement vector may represent, for a particular time, a position offset with respect to the test axis between a position of the first shape with a position of the second shape based on the reference positions in the reference data associated with such shapes. Additionally or alternatively, some embodiments generate an orientation displacement angle. The orientation displacement angle is generated by at least comparing the reference data of the second shape with reference data of the first shape. In this regard, the positional displacement vector may represent, for a particular time, an angle offset with respect to the test axis between a position of the first shape with a position of the second shape based on the reference positions in the references data associated with such shapes.

Some embodiments determine a HMD movement tracking error based on the positional displacement vector. In some embodiments, the HMD movement tracking error is represented based on a magnitude or other value of the positional displacement vector. In this regard, the HMD movement tracking error may represent an amount of positional displacement between the first shape and the second shape, indicating a tracking offset affecting the accuracy of handling movements along the test axis.

The HMD movement tracking error may be utilized in any of a myriad of manners. Some embodiments utilize the HMD movement tracking error to determine test result indicating whether the test should be deemed a success (e.g., the error determined is sufficient to enable realistic simulating), or failure (e.g., the error determined is not sufficient to enable realistic simulating). For example, the HMD movement tracking error may be compared with a threshold to determine whether or not the HMD movement tracking error is within the desired threshold. The test result may be output for further use, rendering, or the like, for example as output to a display of the HMD itself, or at least one additional display observed by another user. In this regard, embodiments may be utilized to identify viewpoint fidelity associated with a HMD, and advantageously determine whether such fidelity is sufficient for the purpose of outputting a realistic simulation environment or whether an HMD of a simulation apparatus addressing for outputting the realistic simulation environment.

Example Embodiments of the Disclosure

Example embodiments based on measuring viewpoint fidelity in a simulation involving a HMD are described, for example as part of measuring or testing the realism validity of a flight simulation system. Additionally or alternatively, example embodiments, based on measuring particular data indicating errors associated with viewpoint fidelity, testing may be performed that indicates whether such data indicates that a test of viewpoint fidelity was passed or failed.

Example System Implementations and Devices

FIG. 1 illustrates a block diagram for an example system in accordance with at least one aspect of the disclosure. Specifically, FIG. 1 illustrates an example system 100. The example system 100 includes a simulation apparatus 150, at least one display (e.g., display 114 and display 116), a simulation host system 104, and an image generation system 102. In some embodiments, the system 100 optionally includes one or more external sensors 112.

The simulation apparatus 150 includes any number of components, including any number of devices, sub-systems, or other hardware or software, that enables simulation of a particular environment, for example an environment for operating a particular vehicle. In some embodiments, the simulation apparatus 150 includes an operator system 110, a head mounted device 106, and a motion system 108. The head mounted device 106 in some embodiments is mounted on or otherwise secured to a test stand, such that a manipulation to the test stand manipulates a position or orientation of the head mounted device 106. In some embodiments, the head mounted device 106 is mounted to or otherwise secured to a user in the simulation apparatus 150, for example that is operating certain controls thereof as part of simulating operation of a vehicle via the simulation environment.

The head mounted device 106 includes a display and one or more input or output elements. For example, in some embodiments, the head mounted device 106 includes a virtual reality headset. The head mounted device 106 may include one or more displays that depict a virtual viewpoint, or multiple virtual viewpoints, of a virtual environment. The head mounted device 106 additionally may include one or more sensors that determine or record a headset orientation, position, movement, or the like. In some embodiments, the head mounted device 106 is worn by a user, for example an operator associated with the simulation apparatus 150. Additionally or alternatively, in some embodiments, the head mounted device 106 is secured to a test stand that functions to replace a user head in the simulation apparatus 150. The test stand may be configured to enable movement along a particular test axis, for example such that the head mounted device 106 is similarly moved in accordance with the movement along the test axis. In some embodiments, the head mounted device 106 is configured to provide data representing movements of the HMD or changes in movement detected by the HMD, for example as HMD spatial position data. In some embodiments, the head mounted device 106 includes the Varjo™ XR-4 series headset.

The operator system 110 is configured to provide input in accordance with a particular environment to be simulated. For example, in some embodiments, the operator system 110 includes control inputs that mirror those of a particular vehicle for which simulated operation is to be performed. In one example context, the operator system 110 includes cockpit controls of an aerial vehicle for which simulated operation is to be performed. Such inputs may correspond to data values that represent updates to such controls, including any number of analog or digital inputs, as a user interacts with such controls.

The motion system 108 simulates movement, vibrations, or other motion associated with an environment. In one example context, the motion system 108 simulates motion effects associated with operation of an aerial vehicle, for example based on inputs or determined simulation states associated with such a system of the aerial vehicle operating. In some embodiments, the motion system 108 comprises a base system upon which one or more other components of the simulation apparatus 150 are mounted for simulating such motion effects. For example, in some embodiments, the operator system 110 or the head mounted device 106 are mounted on, secured to, or otherwise positioned on the motion system 108. In this regard, motion effects initiated by the motion system 108 affect the position or orientation of such other components. In some embodiments, the motion system 108 includes a CKAS W10 6-degree of freedom (DOF) motion system.

The system 100 further includes a simulation host system 104. The simulation host system includes hardware, software, firmware, or any combination thereof, that generates, maintains, or configures a simulation environment. For example, in some embodiments, the simulation host system 104 includes a specially configured server, where the server includes at least specially configured hardware (e.g., executing particular firmware, software, or both) that maintains the simulation environment. For example, the simulation host system 104 may include at least one processor (e.g., a CPU, multiple CPUs, or the like), and at least one non-transitory computer-readable storage medium (e.g., a memory), and is configured to execute the simulation environment upon execution of computer program instructions stored on the at least one non-transitory computer-readable storage medium by the at least one processor.

In some embodiments, the simulation host system 104 maintains one or more simulation environments based on generated or received data associated with at least one element of the simulation environment. For example, in some embodiments, the simulation host system 104 receives input data from the operator system 110, motion system 108, or head mounted device 106. The operator system 11o may provide input associated with user (e.g., an operator) interactions with controls of the operator system 110, the head mounted device 106 may provide orientation or position data based on movement of the head mounted device 106, or the motion system 108 may provide movement data indicating changes to orientation, position, vibrations, or other movements, for example where such movements affect the other components of the simulation apparatus 150. Such data may be provided directly to the simulation host system 104, or in other embodiments is provided via one or more intermediary devices. In some embodiments, the simulation host system 104 interacts with an Unreal Engine™ instance, for example to update visual depictions of the virtual environment.

Additionally or alternatively, in some embodiments, the simulation host system 104 commands or otherwise makes demands of the image generation system 102 to maintain the virtual environment. For example, in some embodiments, such commands cause updating of one or more virtual models within the virtual environment. Such commands may be based at least in part on simulation results or control input from the user received via the simulation host system 104. For example, in some embodiments the simulation host system 104 sends one or more commands to the image generation system 102 to move a virtual model corresponding to a particular vehicle two feet vertically within its virtual environment, and the image generation system 102 includes hardware, software, firmware, or a combination thereof that performs the commanded movement.

In some embodiments, the system 100 includes one or more external sensors 112. The external sensors may detect or measure one or more aspects associated with the simulation apparatus 150, or a portion thereof, for use in configuring the virtual environment or a virtual viewpoint of the virtual environment. In some embodiments, the external sensors 112 include movement sensors, cameras, or the like. In some embodiments, the external sensors 112 are used to detect particular elements in or associated with the simulation apparatus 150, for example positions of a hand of an operator interacting with the simulation apparatus 150. Additionally or alternatively, in some embodiments, the external sensors 112 measure data values associated with the environment of or around the simulation apparatus 150. The external sensors 112 may provide measured data to the image generation system 102, for example for use in configuring one or more virtual elements in a virtual environment. The image generation system 102 may utilize such data to accurately depict positions, orientations, or other states of such virtual elements within the virtual environment. For example, the image generation system 102 may receive data corresponding to positions of particular real-world elements of the real-world simulation environment utilize such data to accurately position virtual elements in the virtual environment that corresponding to such real-world simulation elements.

In some embodiments, the system 100 includes an image generation system 102. The image generation system 102 includes hardware, software, firmware, or any combination thereof, that generates or provides output data for rendering to one or more displays. The output data includes renderings of a virtual viewpoint within a virtual environment, for example as simulated by the simulation host system 104. In some embodiments, the image generation system 102 and the simulation host system 104 share one or more hardware or software components, for example where the simulation host system 104 and the image generation system 102 are executed on the same server, or where the simulation host system 104 and the image generation system 102 are embodied by submodules of a particular simulation software package. In one example embodiment, the image generation system 102 comprises a single image generation channel, for example of an instance of Unreal Engine's™ TRU simulation environment.

The image generation system 102 is configured to render particular shapes and other virtual elements of the virtual environment generated, maintained, or otherwise configured by the simulation host system 104. In some embodiments, the image generation system 102 provides output data for rendering to one or more displays of the head mounted device 106. Additionally or alternatively, in some embodiments, the image generation system 102, the simulation host system 104, or another system communicably coupled to one of such systems, provides output data utilized to cause rendering based on such data to the display 114 (e.g., a repeater display), display 116 (e.g., an instructor display), or both. In some embodiments, the image generation system 102 does not directly output to the additional display 114 or display 116, and such displaying may be facilitated indirectly via one or more other systems in communication with the image generation system 102. In this regard, the image generation system 102 may continuously cause outputting or cause rendering of frames depicting a virtual viewpoint of the virtual environment as updated inputs affecting the virtual environment are received, for example changes in orientation or position of the head mounted device 106, control input changes via the operator system 110, or motion cueing data or related positioning information from the motion system 108 of the simulation apparatus 150.

In some embodiments, one of the image generation system 102 or the simulation host system 104 is specially configured to perform the one or more tests described herein. Additionally or alternatively, in some embodiments, the system 100 includes particular elements, subsystems, or the like configured via hardware, software, firmware, or any combination thereof, to perform a particular test or set of tests. For example, in some embodiments, the system 100 additionally or alternatively includes one or more specific measurement equipment, computer vision systems or components, or the like that enables process operations for detecting a position offset, angle offset, or both, between shapes or other virtual elements in a virtual environment as described herein. It will be appreciated that different systems may include different components or specialized configurations of such components that perform such testing or particular operations thereof. For example, in some embodiments, the system 100 includes an imaging photometer, an image generation system 102 or simulation host system 104 configured to perform computer vision, or the like to visually determine a position offset, angle offset, or both between two or more shapes within a virtual viewpoint as described herein.

In some embodiments, the image generation system 102 includes a specially configured server, where the server includes at least specially configured hardware (e.g., executing particular firmware, software, or both) that configures renderings of a virtual viewpoint for a virtual environment, for example maintained by the simulation host system 104. The image generation system 102 may include at least one processor (e.g., a CPU, multiple CPUs, or the like), and at least one non-transitory computer-readable storage medium (e.g., a memory), and is configured to cause the renderings upon execution of computer program instructions stored on the at least one non-transitory computer-readable storage medium by the at least one processor.

In some embodiments, the system 100 includes any number of displays, each configured to render data viewable by one or more viewers. As illustrated, the head mounted device 106 includes at least one display that provides renderings of a virtual environment. For example, in some embodiments the head mounted device 106 embodies a headset including one or more display that are configured to provide viewing of a three-dimensional virtual environment while wearing the head mounted device 106. Additionally or alternatively, as illustrated, the system 100 includes a display 114 that functions as a repeater display. In this regard, the display 114 may render the same data as outputted to the head mounted device 106, such that the corresponding renderings may be viewed external from the head mounted device 106 by one or more users. Additionally or alternatively, as illustrated, the system 100 further includes a display 116 that functions as an instructor display. The instructor display in some embodiments includes a second repeat display that renders the same data as outputted to the head mounted device 106. In some embodiments the display 116 includes one or more additional or alternative renderings that are specific to that display, for example additional UI elements, controls, or the like that are specific to operations performed by another user associated with the simulation (e.g., instructor-specific operations). In this regard, the image generation system 102 may provide data representing a virtual viewpoint of a simulation environment for rendering to any one or more of such displays associated therewith.

Figure 2:
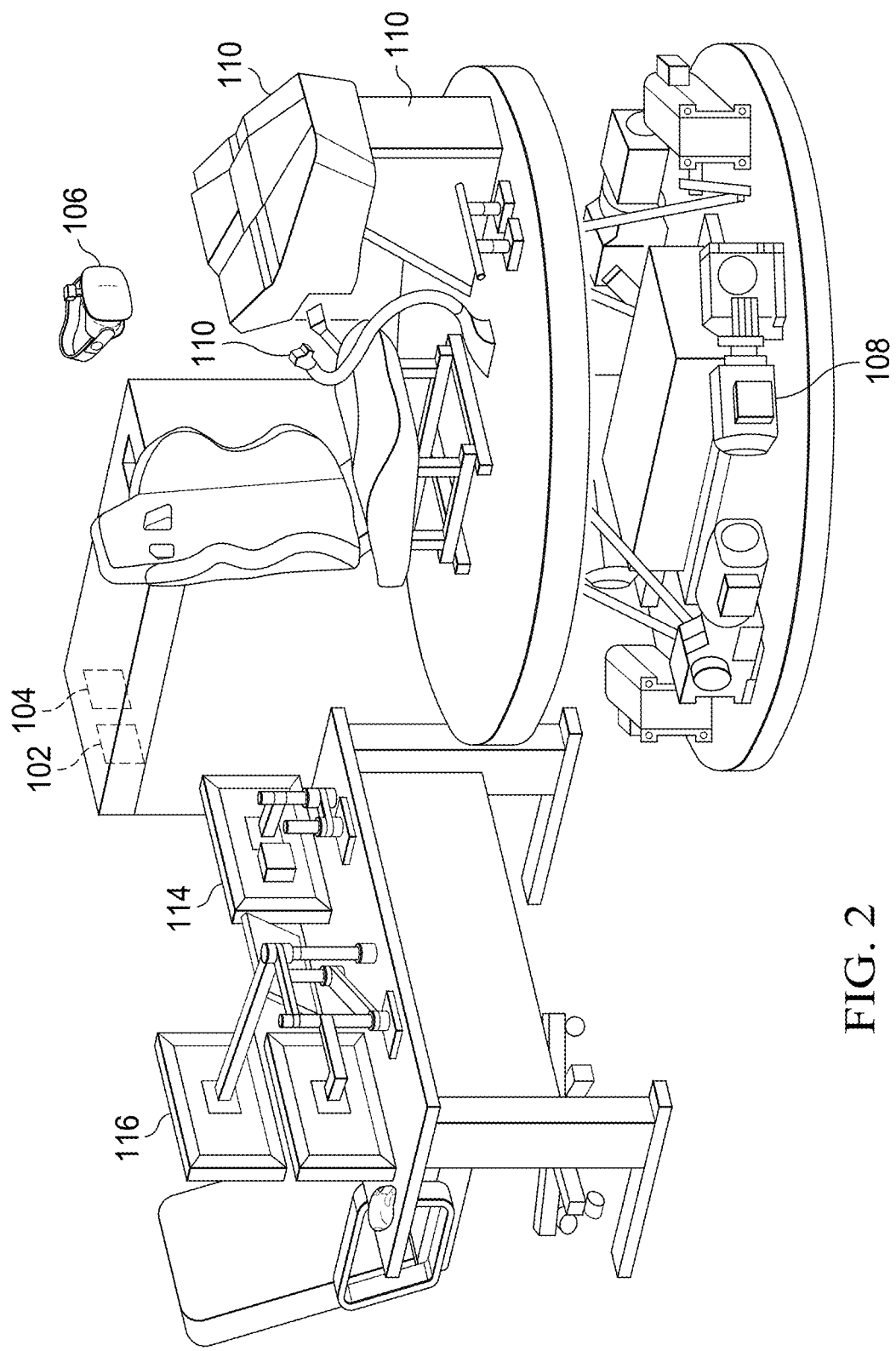
FIG. 2 illustrates a depiction of devices positioned for an example system in accordance with at least one aspect of the disclosure.

FIG. 2 illustrates a depiction of devices positioned for an example system in accordance with at least one aspect of the disclosure. As depicted, the operator system 110 includes any number of subcomponents, for example in some embodiments the operator system 110 includes one or more cockpit controls, one or more primary controls, or one or more input/output (I/O) components. The operator system 110 includes a seat or other control where an operator may be located (e.g., seated) during operation of the operator system or the simulation apparatus 150 associated therewith.

Further as depicted, the operator system 110 and the head mounted device 106 may be positioned such that they are secured to, or otherwise positioned on top of, the motion system 108. In this regard, each movement or motion performed via the motion system 108 may impact such other devices positioned on the motion system 108. The display 116, display 114, image generation system 102, and simulation host system 104 are positioned separately from the motion system 108, such that movements of the motion system 108 do not impact such other devices. The various components may be communicatively coupled via wired or wireless means to perform the data transmissions described herein.

Figure 3A:
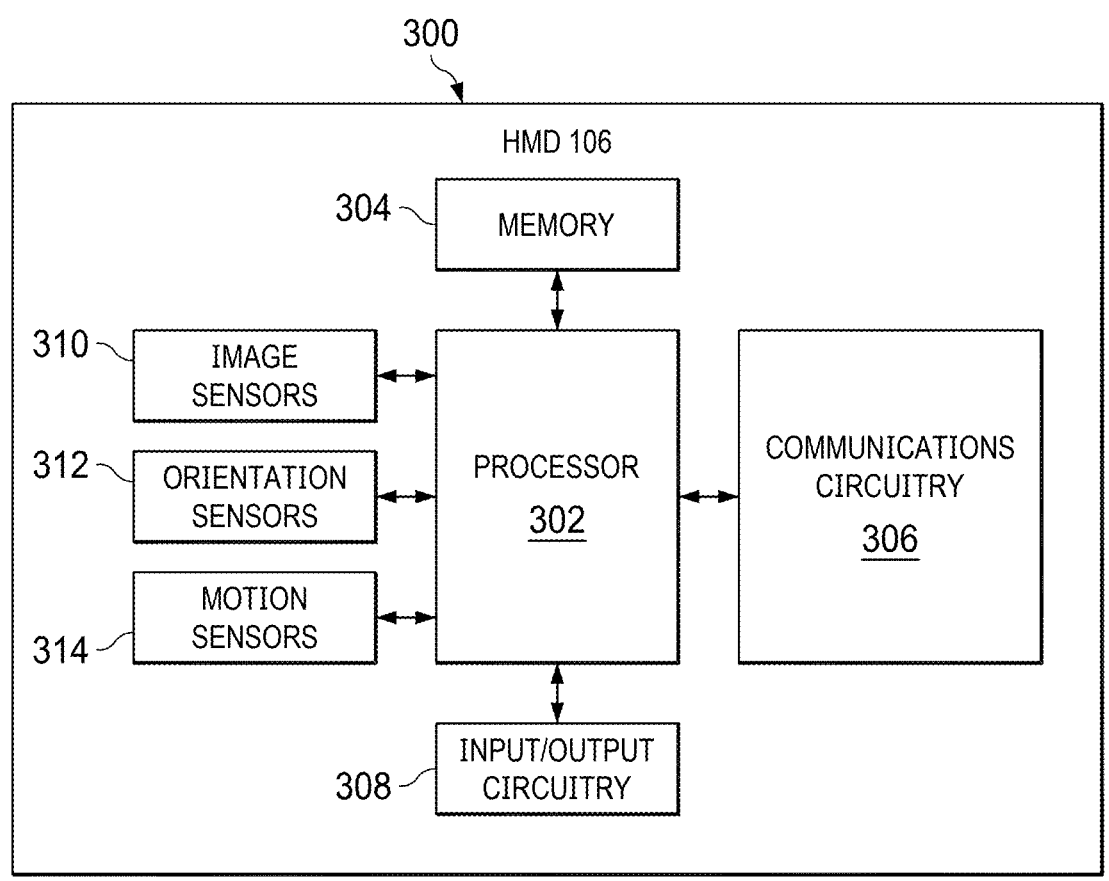
FIG. 3A illustrates a block diagram of an example HMD in accordance with at least one aspect of the disclosure.

FIG. 3A illustrates a block diagram of an example HMD in accordance with at least one aspect of the disclosure. Specifically, FIG. 3A depicts an example apparatus 300 embodying an example of the head mounted device 106. The apparatus 300 includes a processor 302, a memory 304, a communications circuitry 306, an input/output circuitry 308, one or more image sensors 310, one or more orientation sensors 312, or one or more motion sensors 314. The apparatus 300 may be configured, using one or more portions of the circuitry depicted, to execute the operations described herein.

Although the components are described with respect to functional limitations, it should be understood that the particular implementations necessarily include the use of particular hardware. It should also be understood that certain components described herein may include similar or common hardware. For example, two sets of circuitry or modules may both leverage use of the same processor, network interface, storage medium, or the like to perform their associated functions, such that duplicate hardware is not required for each set of circuitry. The use of the term "module" or the term "circuitry" as used herein with respect to components of the apparatus 300 should therefore be understood to include particular hardware configured to perform the functions associated with the particular sets of circuitry as described herein.

Additionally or alternatively, the terms "circuitry" and "module" should be understood broadly to include hardware and, in some embodiments, software or firmware for configuring the hardware. For example, in some embodiments "circuitry" and "module" may include processing circuitry, non-transitory storage media, network interfaces, input/output devices, or the like. In some embodiments, other elements of the apparatus 300 may provide or supplement the functionality of the particular set of circuitry. The processor 302 may provide processing functionality, the memory 304 may provide processing functionality, the memory 304 may provide storage functionality, the communications circuitry 306 may provide network interface functionality, and the like.

In some embodiments, the processor 302 (or processor or any other processing circuitry assisting or otherwise associated with the processor) may be in communication with the memory 304 via a bus for passing information among components of the apparatus 300. The memory 304 may be non-transitory and may include, for example, one or more volatile or non-volatile memories. In other words, for example, the memory may be an electronic storage device (e.g., a computer readable storage medium). The memory 304 may be configured to store information, data, content, applications, instructions, or the like, for enabling the apparatus 300 to carry out various functions in accordance with example embodiments of the present disclosure.

The processor 302 may be embodied in any one or more of a myriad of ways and may, for example, include one or more processing devices configured to perform independently. Additionally or alternatively, the processor 302 may include one or more processors configured in tandem via a bus to enable independent execution of instructions, pipelining, or multithreading. The use of the terms "processor,"

"processing module," and "processing circuitry" may be understood to include a single-core processor, a multi-core processor, multiple processors internal to the apparatus, field-programmable gate array(s) (FPGA(s)), graphic processing unit(s) (GPU(s)), application specific integrated circuit(s) (ASIC(s)), or remote or "cloud" processors.

In an example embodiment, the processor 302 may be configured to execute computer-coded instructions stored in the memory 304 or otherwise accessible to the processor. Alternatively, or additionally, the processor 302 may be configured to execute hard-coded functionality. As such, whether configured by hardware or software methods, or by a combination thereof, the processor 302 may represent an entity (e.g., physically embodied in circuitry) capable of performing operations according to an embodiment of the present disclosure while configured accordingly. Alternatively, as another example, when the processor is embodied as an executor of software instructions, the instructions may specially configure the processor to perform the algorithms or operations described herein when the instructions are executed.

As one example context, the processor 302 may be configured to provide data associated with the orientation, position, movement, or elements associated with interacting with the HMD. Additionally or alternatively, in some embodiments, the processor 302 may be configured to output a virtual environment, for example by displaying an image representation of a virtual viewpoint of a portion of the virtual environment at a particular time. The virtual environment may be continuously updated by one or more systems, for example an image generation system 102, as interactions occur via a simulation apparatus. The processor 302 outputs the virtual environment including at least a first shape and a second shape in a virtual viewpoint of the virtual environment. The processor 302 depicts the first shape in front of the second shape in the virtual viewpoint and depicts adjustments to the second shape as the virtual viewpoint adjusts. The processor 302 depicts the first shape affixed in the virtual viewpoint of the virtual environment. The virtual viewpoint of the virtual environment is configured to adjust in response to movement of a head mounted display secured to a test stand. The processor 302 may be configured to display updates to the generated virtual viewpoint of the virtual environment in response to received data indicating a motion by the HMD, for example HMD spatial position data associated with a movement of the test stand to an excursion value along a test axis or a movement from the excursion value to a neutral value along the test axis. In some embodiments, the processor 302 is configured to continuously render the generated virtual environment, for example to a display screen of the apparatus 300, as updated data associated with the virtual environment is received in response to data that is provided by the processor 302 of the HMD.

In some embodiments, the apparatus 300 may include input/output circuitry 308 that may, in turn, be in communication with processor 302 to provide output to the user and in some embodiments, to receive an indication of one or more user inputs. The input/output circuitry 308 may comprise a user interface and may include a display (e.g., for rendering one or more user interfaces, such as to the display). The user interfaces comprise a web user interface, customized device application, native device interface, a mobile or desktop application, or in some embodiments includes a client device linked or otherwise networked to an associated system configuring the virtual environment. In some embodiments, the input/output circuitry 308 may also include gesture controls, soft keys, buttons, a microphone, a speaker, touch areas, or other input/output mechanisms. The processor, such as the processor 302, or the user interface circuitry comprising the processor, for example processor 302, may be configured to control one or more functions of one or more user interface elements through computer program instructions (e.g., software or firmware) stored on a memory accessible to the processor 302 (e.g., via memory 304, or the like).

The communications circuitry 306 may be any means, including for example and without limitation a device or circuitry embodied in hardware, software, firmware, or any combination thereof, which is configured to receive or transmit data from or to a network or any other device, circuitry, or module in communication with the apparatus 300. In this regard, the communications circuitry 306 may include, for example, a network interface for enabling communications with a wired or wireless communications network. For example, the communications circuitry 306 may include one or more network interface cards, antennas, buses, switches, routers, modems, and supporting hardware or software, or any other device suitable for enabling communications via a network. Additionally or alternatively, in some embodiments the communication interface may include the circuitry for interacting with the antennas to cause transmission of signals via the antennas or to adjust receipt of signals received via the antennas.

The apparatus 300 in some embodiments further includes one or more image sensors 310. In some embodiments, the image sensors 310 include one or more cameras that capture images, videos, or the like surrounding the head mounted device. For example, in some embodiments, the image sensors 310 includes cameras that face outward from the apparatus 300, for example to the sides, above, below, or forward from an axis relatively normal to a wearer's eyes. In some embodiments, the image sensors 310 includes cameras that face inward from the apparatus 300, for example towards the eyes of a wearer. The image sensors 310 may be processed to detect objects in the environment of the apparatus 300 (e.g., hands, eyes, operator controls, and the like) that are associated with interacting with a virtual environment or depicting virtual elements in the virtual environment.

The apparatus 300 in some embodiments further includes one or more orientation sensors 312. In some embodiments, the orientation sensors 312 include one or more devices that are specially configured to measure orientation or position data associated with the apparatus 300. In some embodiments, the orientation sensors 312 includes at least one gyroscope, accelerometer, magnetometer, LiDAR sensor, inertial measurement unit, or the like. In some embodiments, the one or more orientation sensors 312 includes one or more image sensors, for example of the image sensors 310, where orientation or position is determined from captured image data. The orientation sensors may detect or measure changes in rotation or position of the apparatus 300. For example, the orientation sensors 312 may measure data indicating the orientation or position of the apparatus 300 as the head mounted device is repositioned via a test stand.

The apparatus 300 in some embodiments further includes one or more motion sensors 314. In some embodiments, the motion sensors 314 include a vibration motion sensor, a passive infrared sensor, a hybrid type sensor, or the like that detects movement or reorientation of the apparatus 300. In some embodiments, the motion sensors 314 include one or more of the orientation sensors 312. In some other embodiments, the motion sensors 314 include one or more of the image sensors 310, for example where motion is detected from captured image data.

In some embodiments, one or more of the circuitry of apparatus 300 is combined into a single module configured to perform some, or all, of the actions described with respect to the individual circuitry. For example, in some embodiments, the processor 302 is combined with one or more of the other circuitry components of the apparatus 300.

Figure 3B:
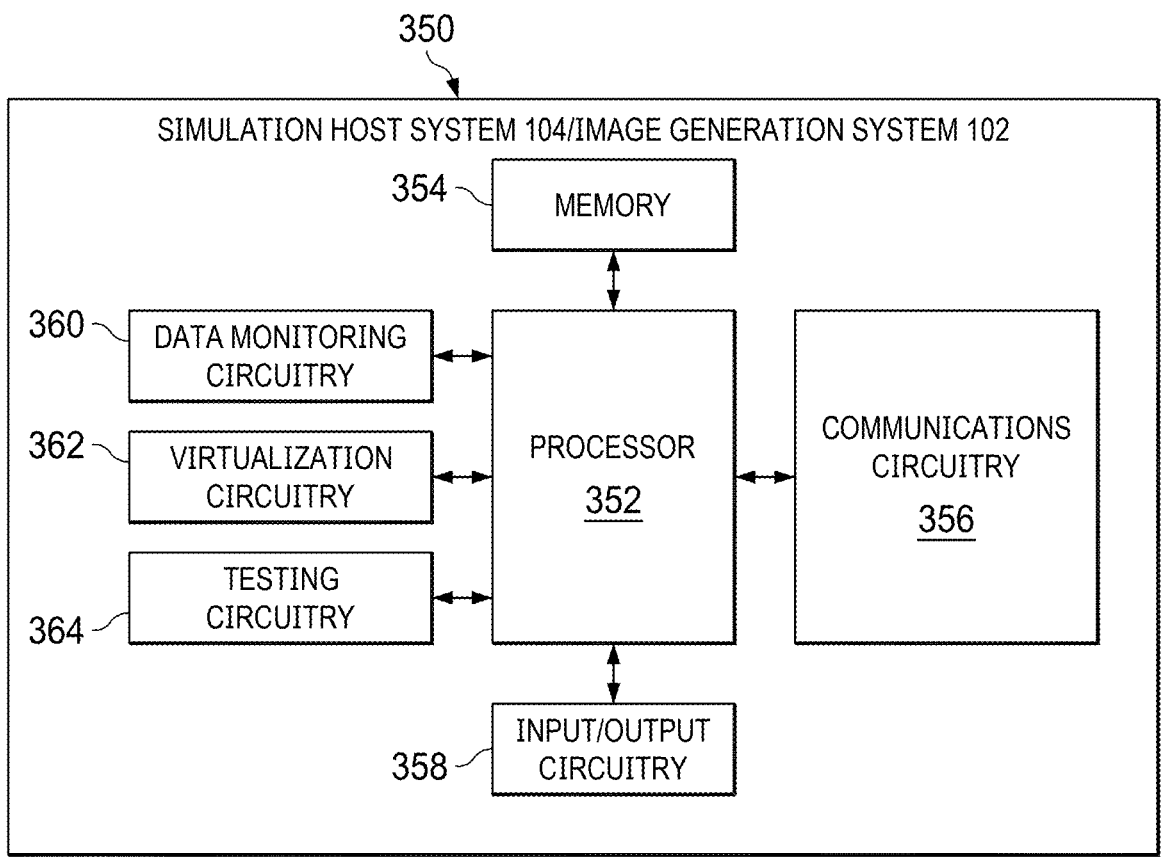
FIG. 3B illustrates a block diagram of an example apparatus in accordance with at least one aspect of the disclosure.

FIG. 3B illustrates a block diagram of an example apparatus in accordance with at least one aspect of the disclosure. Specifically, FIG. 3B depicts an example apparatus 350 embodying an example implementation of the simulation host system 104 or image generation system 102. The apparatus 350 includes a processor 352, a memory 354, a communications circuitry 356, an input/output circuitry 358, data monitoring circuitry 360, virtualization circuitry 362, and testing circuitry 364. The apparatus 350 may be configured, using one or more portions of the circuitry depicted, to execute the operations described herein.

Although the components are described with respect to functional limitations, it should be understood that the particular implementations necessarily include the use of particular hardware. It should also be understood that certain components described herein may include similar or common hardware. For example, two sets of circuitry or modules may both leverage use of the same processor, network interface, storage medium, or the like to perform their associated functions, such that duplicate hardware is not required for each set of circuitry. The use of the term "module" or the term "circuitry" as used herein with respect to components of the apparatus 350 should therefore be understood to include particular hardware configured to perform the functions associated with the particular sets of circuitry as described herein.

Additionally or alternatively, the terms "circuitry" and "module" should be understood broadly to include hardware and, in some embodiments, software or firmware for configuring the hardware. For example, in some embodiments "circuitry" and "module" may include processing circuitry, non-transitory storage media, network interfaces, input/output devices, or the like. In some embodiments, other elements of the apparatus 350 may provide or supplement the functionality of the particular set of circuitry. The processor 352 may provide processing functionality, the memory 354 may provide processing functionality, the memory 354 may provide storage functionality, the communications circuitry 356 may provide network interface functionality, and the like.

In some embodiments, the processor 352 (or processor or any other processing circuitry assisting or otherwise associated with the processor) may be in communication with the memory 354 via a bus for passing information among components of the apparatus 350. The memory 354 may be non-transitory and may include, for example, one or more volatile or non-volatile memories. In other words, for example, the memory may be an electronic storage device (e.g., a computer readable storage medium). The memory 354 may be configured to store information, data, content, applications, instructions, or the like, for enabling the apparatus 350 to carry out various functions in accordance with example embodiments of the present disclosure.

The processor 352 may be embodied in any one or more of a myriad of ways and may, for example, include one or more processing devices configured to perform independently. Additionally or alternatively, the processor 352 may include one or more processors configured in tandem via a bus to enable independent execution of instructions, pipelining, or multithreading. The use of the terms "processor," "processing module," and "processing circuitry" may be understood to include a single-core processor, a multi-core processor, multiple processors internal to the apparatus, field-programmable gate array(s) (FPGA(s)), graphic processing unit(s) (GPU(s)), application specific integrated circuit(s) (ASIC(s)), or remote or "cloud" processors.

In an example embodiment, the processor 352 may be configured to execute computer-coded instructions stored in the memory 354 or otherwise accessible to the processor. Alternatively, or additionally, the processor 352 may be configured to execute hard-coded functionality. As such, whether configured by hardware or software methods, or by a combination thereof, the processor 352 may represent an entity (e.g., physically embodied in circuitry) capable of performing operations according to an embodiment of the present disclosure while configured accordingly. Alternatively, as another example, when the processor is embodied as an executor of software instructions, the instructions may specially configure the processor to perform the algorithms or operations described herein when the instructions are executed.

As one example context, the processor 352 may be configured to generate a virtual environment or a particular virtual viewpoint thereof. Additionally or alternatively, in some embodiments, the processor 352 may be configured to request or receive data from one or more other devices, for example positioning information from a motion cueing system or HMD spatial position data from an HMD. Additionally or alternatively, in some embodiments, the processor 352 may be configured to adjust (e.g., by moving) a virtual viewpoint of the virtual environment in response to movement of a HMD. For example, the processor 352 may move the virtual viewpoint in a manner that tracks data representing an amount of movement of the HMD on a test stand. Additionally or alternatively, in some embodiments, the processor 352 may be configured to record reference data of at least one shape in a virtual viewpoint of a virtual environment, for example reference data representing a position of one or more reference points of a first shape or a second shape. Additionally or alternatively, in some embodiments, the processor 352 may be configured to generate at least one positional displacement vector or at least one orientation displacement angle. Additionally or alternatively, in some embodiments, the processor 352 may be configured to detect a test completion trigger. Additionally or alternatively, in some embodiments, the processor 352 may be configured to determine at least one error based on the at least one positional displacement vector or at least one orientation displacement angle. Additionally or alternatively, in some embodiments, the processor 352 may be configured to determine a test result based on one or more errors. Additionally or alternatively, in some embodiments, the processor 352 may be configured to output a test result to one or more displays.

In some embodiments, the apparatus 350 may include input/output circuitry 358 that may, in turn, be in communication with processor 352 to provide output to the user and in some embodiments, to receive an indication of one or more user inputs. The input/output circuitry 358 may comprise a user interface and may include a display (e.g., for rendering one or more user interfaces, such as to the display). The user interfaces comprise a web user interface, customized device application, native device interface, a mobile or desktop application, or in some embodiments includes a client device linked or otherwise networked to an associated system configuring the virtual environment. In some embodiments, the input/output circuitry 358 may also include gesture controls, soft keys, buttons, a microphone, a speaker, touch areas, or other input/output mechanisms. The processor, such as the processor 352, or the user interface circuitry comprising the processor, for example processor 352, may be configured to control one or more functions of one or more user interface elements through computer program instructions (e.g., software or firmware) stored on a memory accessible to the processor 352 (e.g., via memory 354, or the like).

The communications circuitry 356 may be any means, including for example and without limitation a device or circuitry embodied in hardware, software, firmware, or any combination thereof, which is configured to receive or transmit data from or to a network or any other device, circuitry, or module in communication with the apparatus 350. In this regard, the communications circuitry 356 may include, for example, a network interface for enabling communications with a wired or wireless communications network. For example, the communications circuitry 356 may include one or more network interface cards, antennas, buses, switches, routers, modems, and supporting hardware or software, or any other device suitable for enabling communications via a network. Additionally or alternatively, in some embodiments the communication interface may include the circuitry for interacting with the antennas to cause transmission of signals via the antennas or to adjust receipt of signals received via the antennas.

The apparatus 350 in some embodiments further includes the data monitoring circuitry 360. In some embodiments, the data monitoring circuitry 360 is configured to communicate with one or more devices to receive data for processing. For example, in some embodiments, the data monitoring circuitry 360 is configured to receive positioning information from a motion cueing system, each portion of positioning information representing a movement applied to an HMD on a test stand. The positioning information in some embodiments includes one or more portions associated with one or more times, with each portion being a movement or effect of a movement at a particular time in a time series. Additionally or alternatively, in some embodiments, the data monitoring circuitry 360 is configured to receive HMD spatial position data associated with an HMD from the HMD or one or more sensors thereof. The HMD spatial position data associated with the HMD in some embodiments represents a change in position (e.g., via translation or orientation) detected by the HMD via one or more sensors thereof or otherwise associated with monitoring movement of the HMD. The data monitoring circuitry 360 may continuously communicate with one or more of such devices.

The apparatus 350 in some embodiments further includes virtualization circuitry 362. In some embodiments, the virtualization circuitry 362 is configured to generate or configure a virtual environment, or one or more virtual elements therein. For example, in some embodiments the virtualization circuitry 362 generates a virtual environment that includes at least a first shape and a second shape. In some embodiments, the virtualization circuitry 362 configures at least a first shape and a second shape for depicting within a virtual viewpoint of the virtual environment. Additionally or alternatively, in some embodiments, the virtualization circuitry 362 is configured to adjust the virtual viewpoint, or one or more of the shapes in the virtual environment, based on received data. For example, in some embodiments, the virtualization circuitry 362 is configured to update a position of a virtual viewpoint in the virtual environment to depict adjustments during testing of the virtual viewpoint and a first shape affixed in the virtual viewpoint with respect to a second shape.

The apparatus 350 in some embodiments further includes testing circuitry 364. In some embodiments, the testing circuitry 364 is configured to detect a test completion trigger that indicates a request to generate a test result for a testing procedure. In some embodiments, the testing circuitry 364 records reference data associated with one or more shapes. In some embodiments, the testing circuitry 364 generates at least one positional displacement vector or at least one orientation displacement angle. In some embodiments, the testing circuitry 364 determines at least one error based on at least one positional displacement vector or at least one orientation displacement. In some embodiments, the testing circuitry 364 determines a test result based on at least one error, for example a HMD orientation tracking error or a HMD movement tracking error. In some embodiments, the testing circuitry 364 determines an offset based on a pixel difference between at least one reference point of each of a first shape and a second shape represented in a virtual viewpoint, or in some embodiments determines an offset based on a difference between a reference position of a reference point of each of the first shape and the second shape in the virtual environment.

In some embodiments, one or more of the circuitry of apparatus 350 is combined into a single module configured to perform some, or all, of the actions described with respect to the individual circuitry. For example, in some embodiments, the processor 352 is combined with one or more of the other circuitry components of the apparatus 350.

Example Virtual Elements in Measuring Viewpoint Fidelity

Example virtual elements of virtual environments simulated in accordance with embodiments of the present disclosure are further provided. In some embodiments, the virtual elements as depicted and discussed are generated or maintained by one or more systems or devices of the system 100. For example, in some embodiments, the simulation host system 104 or the image generation system 102 are configured to generate, render, or otherwise process data associated with the virtual elements as depicted and described herein. The virtual elements may be used in one or more processes for measuring viewpoint fidelity as a HMD is moved, testing viewpoint fidelity, or the like as described herein.

Figure 4:
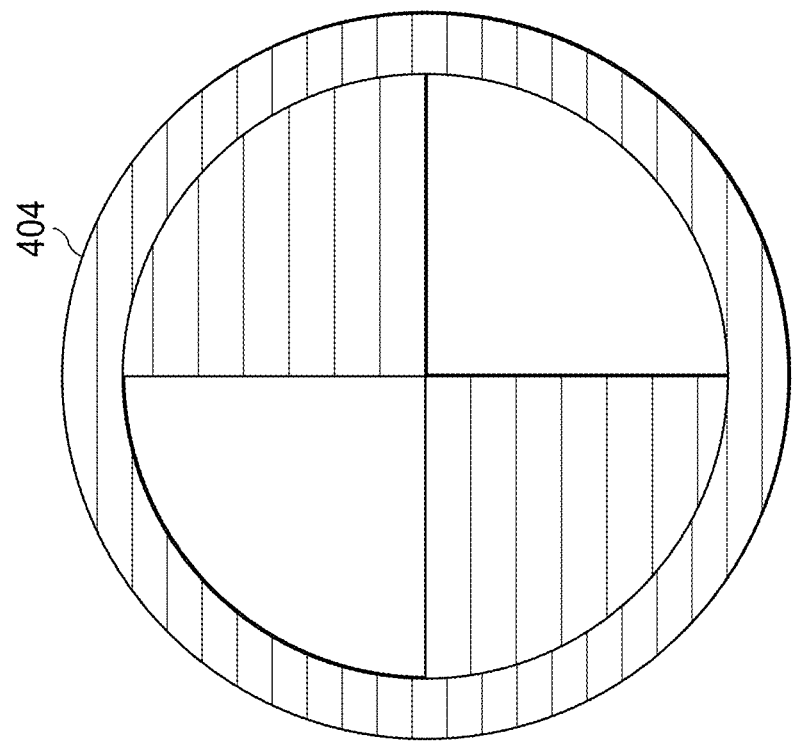
FIG. 4 illustrates a depiction of example shapes in accordance with at least one aspect of the disclosure.
Figure 4:
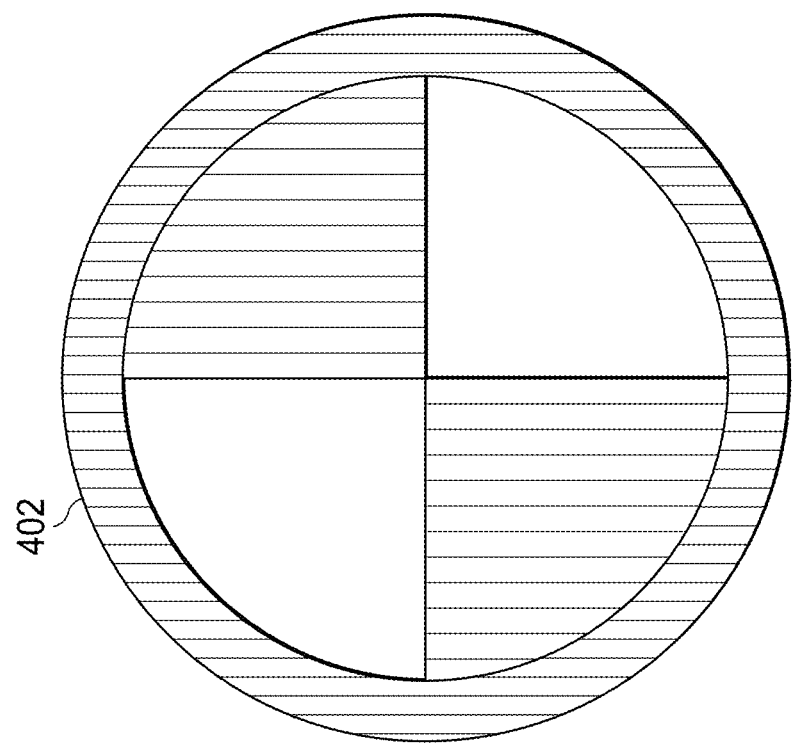

FIG. 4 illustrates a depiction of example shapes in accordance with at least one aspect of the disclosure. Specifically, FIG. 4 depicts a first shape 402 and a second shape 404. The first shape 402 and the second shape 404 embody virtual elements that are renderable within a virtual environment. For example, in some embodiments, the first shape 402 or the second shape 404 are renderable within a virtual viewpoint of a virtual environment. In some embodiments, the first shape 402 and the second shape 404 are each assigned positions in the virtual environment utilized for rendering. Additionally or alternatively, in some embodiments the first shape 402 or the second shape 404 are assigned positions as user interface elements renderable on top of a virtual viewpoint of a virtual environment.

In some embodiments, the first shape and the second shape are rendered within a virtual environment that includes one or more additional virtual elements. For example, in some embodiments, a third shape is rendered within the virtual environment that surrounds the virtual viewpoint. In some embodiments, the third shape is a black sphere, which optionally may obscure or otherwise block rendering of one or more other virtual elements in the virtual environment that are behind the black sphere. The black sphere may be centered on the virtual viewpoint. In this regard, the third shape may form a background of the virtual viewpoint during a testing procedure described further herein.

As illustrated, the first shape 402 includes a circular shape form. The circular shape form includes an inner portion and an outer portion. The outer portion of the first shape 402 forms the circular shape and provides a boundary of the first shape 402. The inner portion of the first shape 402 includes one or more sub-portions, for example four quadrants of an inner circle as depicted. In some embodiments, one or more of the portions (e.g., quadrants) may be cut out from the first shape 402, such that visibility behind the first shape 402 is provided via one or more of the cut out portions. For example as illustrated, the first shape 402 includes a top left cut out portion and a bottom right cut out portion. It will be appreciated that although FIG. 4 depicts quadrants of an inner shape including two cut out portions, in other embodiments any number of cut out portions or shapes may be included.

In some embodiments, a second shape is provided that embodies the same shape form as the first shape. For example, as illustrated the second shape 404 includes the same circular shape form as the first shape 402. Additionally or alternatively, in some embodiments the second shape includes at least one of the same cut out portions as the first shape, for example where the second shape 404 includes a top left cut out portion and a bottom right cut out portion. In this regard, visibility beyond the second shape 404 is provided in circumstances where at least one cut out portion of both the first shape 402 and the second shape 404 remain at least partially overlapping.

In some embodiments, the first shape 402 and the second shape 404 are configured such that visibility is provided through the cut out portions of the first shape 402 and the second shape 404 in circumstances where first shape 402 and the second shape 404 are at least partially overlapping. Additionally or alternatively, in some embodiments the cut out portion of one shape (e.g., the first shape) allows visibility to alignment of that shape with another shape (e.g., the second shape) positioned at least in part behind the one shape. The shape form of the second shape 404 located behind may be used to indicate an offset with the first shape 402. For example, if the left side of the second shape 404 is visible through a bottom right cut out portion of the first shape 402, it may be determined that the first shape 402 is offset to the left or up from the second shape 404. Similarly, if the right side of the second shape 404 is visible through a top left cut out portion of the first shape 402, it may be determined that the first shape is offset to the right or down from the second shape 404.

In some embodiments, the first shape 402 is visually distinguishable from the second shape 404. The first shape 402 and the second shape 404 may be visually distinguishable using any means available to enable a user (e.g., a viewer) to differentiate a boundary of the first shape 402 from a boundary of the second shape 404. For example, in some embodiments the first shape 402 and the second shape 404 are rendered with different colors, patterns, contrasts, or other visual alterations that visually distinguish the first shape 402 and the second shape 404.

In some embodiments, each of the first shape 402 and the second shape 404 may include any number of defined points along the shape. For example, each of the first shape 402 and a second shape 404 include a center point, where the center point may be defined at a particular position within the virtual environment or within a virtual viewpoint of a virtual environment, for example. Additionally or alternatively, in some embodiments each of the first shape 402 and the second shape 404 include a center point of a first cut out portion (e.g., a top left cut out portion), a center point of a second cut out portion (e.g., a bottom right cut out portion), a right hemisphere midpoint, a left hemisphere midpoint, a top hemisphere midpoint, a bottom hemisphere midpoint, a right boundary point, a left boundary point, a top boundary point, a bottom boundary point, or the like. It will be appreciated that any point may be defined along, within, or with respect to a particular shape, for example the first shape 402 or the second shape 404.

In some embodiments, a virtual viewpoint of a virtual environment is configured to adjust in response to one or more inputs. For example, in some embodiments a virtual viewpoint is updated in response to movements of a HMD, such as via translation or rotation along a test axis via a test stand. In one context, if a head mounted device is rotated to the right, the virtual viewpoint of the virtual environment may similarly be rotated in a right direction within the virtual environment, for example via rotation of a virtual camera that is positioned in the virtual environment and captures the virtual viewpoint.

Additionally, in some embodiments, a shape (e.g., the second shape 404) is configured to be affixed in a position within the virtual environment, such that visualization of the shape is dependent on the position or orientation of the element that captures a virtual viewpoint of the virtual environment. For example, the shape (e.g., the second shape 404) may be affixed at a particular position within the virtual environment itself. In this regard, the shape may not move position within the virtual environment as the virtual viewpoint is adjusted, however the position of the shape as rendered in the virtual viewpoint of the virtual environment may be adjusted as the virtual viewpoint adjusts in position or orientation within the virtual environment based on where the shape is within the virtual viewpoint. As one example context, if a virtual viewpoint includes a rendering of a shape affixed to the virtual environment and then the virtual viewpoint is translated from a starting position to the left while the shape affixed to the virtual environment is within the virtual viewpoint, the shape that is affixed within the virtual environment will be depicted at a position more to the right within the virtual viewpoint.

Additionally, in some embodiments, a shape (e.g., the first shape 402) is configured to be affixed within the virtual viewpoint of the virtual environment. In this regard, the shape affixed within the virtual viewpoint of the virtual environment may remain depicted in the same position of the virtual viewpoint even as the virtual viewpoint is adjusted. As a virtual viewpoint is updated in the virtual environment, the position of the shape affixed to the virtual viewpoint may similarly be updated to ensure that the shape remains depicted in the same position within the virtual viewpoint. Thus, as the virtual viewpoint of the virtual environment is adjusted, the position of the shape affixed within the virtual viewpoint moves with it. This can be envisioned as a fixed shape securely fastened to a viewing mechanism, for example a sticker attached to lenses of glasses worn by a wearer, where the sticker remains in the same position within the wearer's vision as the wearer adjusts their head to change what is depicted in their vision.

A position displacement between two shapes is determinable based on positions of a same type of point between the two shapes. In this regard, a type of point of a shape may be utilized as a reference position of that shape, where reference data representing the position of that reference at a single time or at a plurality of times. For example, in some embodiments, a position displacement may be determined based on a difference between a position of a center point of the first shape 402 and a center point of the second shape 404. Additionally or alternatively, in some embodiments, a position displacement may be determined based on a difference between a position of a left point of the first shape 402 and a left point of the second shape 404. In some embodiments, a positional displacement vector is determinable or generable from comparing the reference data of the first shape with reference data of the second shape, for example by comparing positions associated with different types of points on the first and second shape at one or more times. In some embodiments, a position displacement is determined based on a number of pixels between a position in the virtual viewpoint of the first shape and a position in the virtual viewpoint of the second shape.

Figure 5:
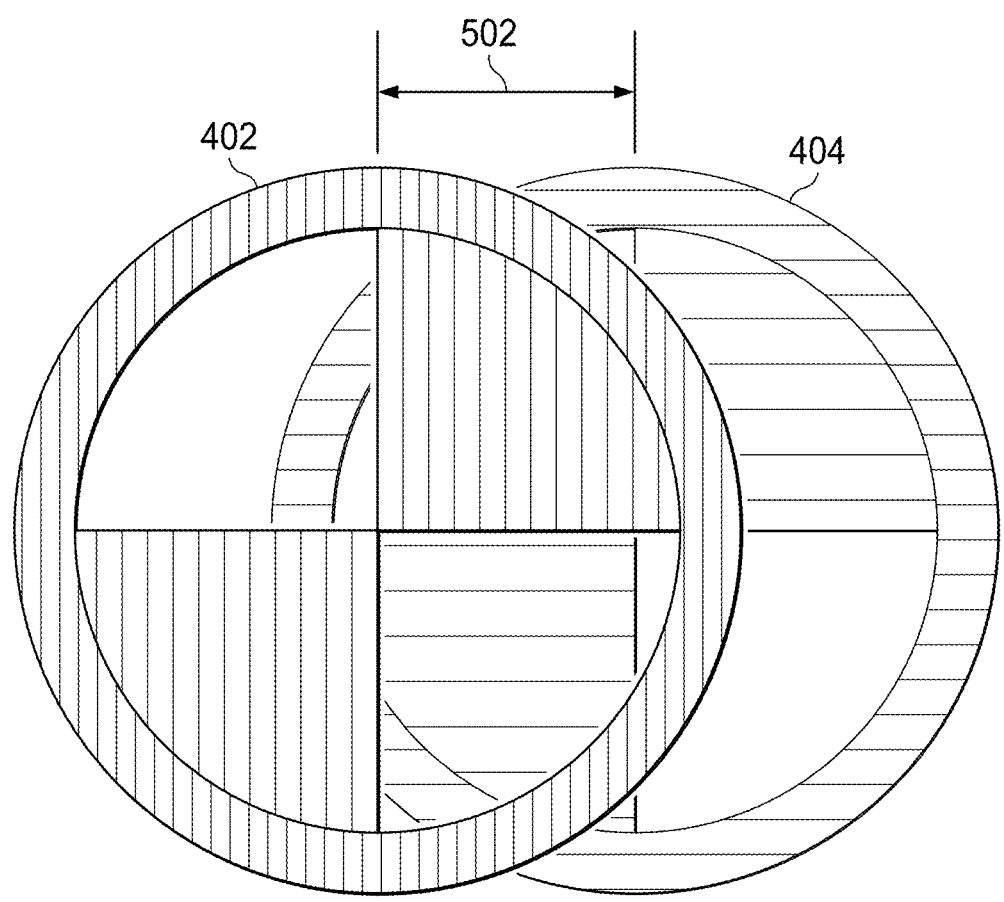
FIG. 5 illustrates a depiction of example shapes at a position offset in accordance with at least one aspect of the disclosure.

FIG. 5 illustrates a depiction of example shapes at a position displacement in accordance with at least one aspect of the disclosure. Specifically, FIG. 5 depicts a position displacement 502 between the first shape 402 and the second shape 404. As depicted, the position displacement 502 represents an offset determined from a center point of the first shape 402 and a center point of the second shape 404. In some embodiments, the position displacement 502 represents a position displacement vector for at least one time based on the difference in position between the center point of the first shape 402 and the center point of the second shape 404.

In some embodiments, a first shape and a second shape begin at a determined offset from one another, where the offset is known or otherwise determinable by the system generating the virtual environment. The determinable offset may correspond to a particular real-world movement, for example where performing the corresponding particular real-world movement is expected to result in perfect or near-perfect alignment between the first shape and the second shape in the virtual viewpoint of the virtual environment. In this regard, a scale corresponding to a distance between positions in the virtual environment and a distance between positions with respect to real-world movement may be known or predetermined to determine the offset at which a second shape should be positioned from a first shape.

In some embodiments, determination of a position displacement is triggered at a particular time during a testing procedure. For example, in some embodiments, a process is initiated to determine a position displacement in response to detecting a test completion trigger. The test completion trigger in some embodiments is a manual input, for example a user engagement with a particular physical control or user interface control. In some embodiments, the test completion trigger is a data-driven determination, for example by detecting that at least one condition is met based on data associated with the virtual environment.

In a circumstance where the first shape 402 and the second shape 404 are associated with the position displacement 502, the shapes are not in perfect alignment, such that there is a visible offset between the first shape 402 and the second shape 404. In some embodiments, the position displacement 502 results from a movement of a HMD that, when converted into movement of a virtual viewpoint of the virtual environment, does not result in the first shape fully obscuring the second shape. For example, the adjustment via the HMD may result from a movement of a test stand along a test axis, such as a movement performed by a test operator or other user associated with the simulation apparatus. In some embodiments, the movement is of the test stand to an excursion value (e.g., a particular test point or a maximal point) along the test axis, such as from a neutral value or other value along the test axis. Additionally or alternatively, in some embodiments, the movement is of the test stand from the excursion value to the neutral value or another value.

Figure 6:
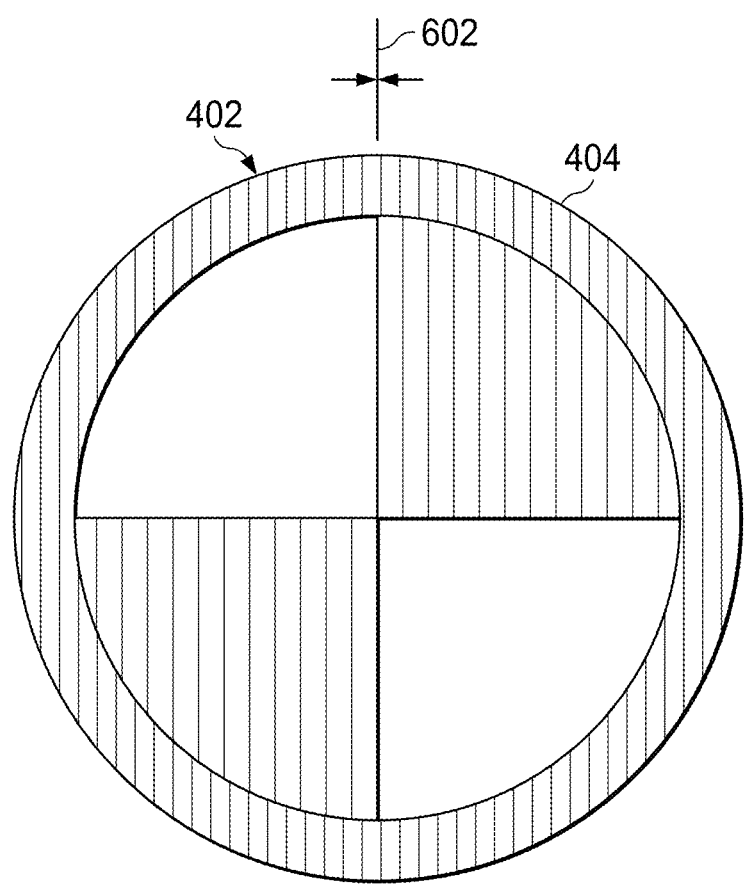
FIG. 6 illustrates a depiction of example shapes at another position offset in accordance with at least one aspect of the disclosure.

FIG. 6 illustrates a depiction of example shapes at another position offset in accordance with at least one aspect of the disclosure. Specifically, FIG. 6 depicts a position displacement 602. Similar to the position displacement 502, the position displacement 602 is depicted as an offset between a center point of the first shape 402 and a center point of the second shape 404. The first shape 402 and the second shape 404 are in preferred alignment as depicted in FIG. 6, such that no (or almost no) visible offset is present between the two shapes. It will be appreciated that, as a result, the position displacement 602 may include at least one smaller offset value than the position displacement 502 to represent the smaller offset between the first shape 402 and the second shape 404.

Figure 7:
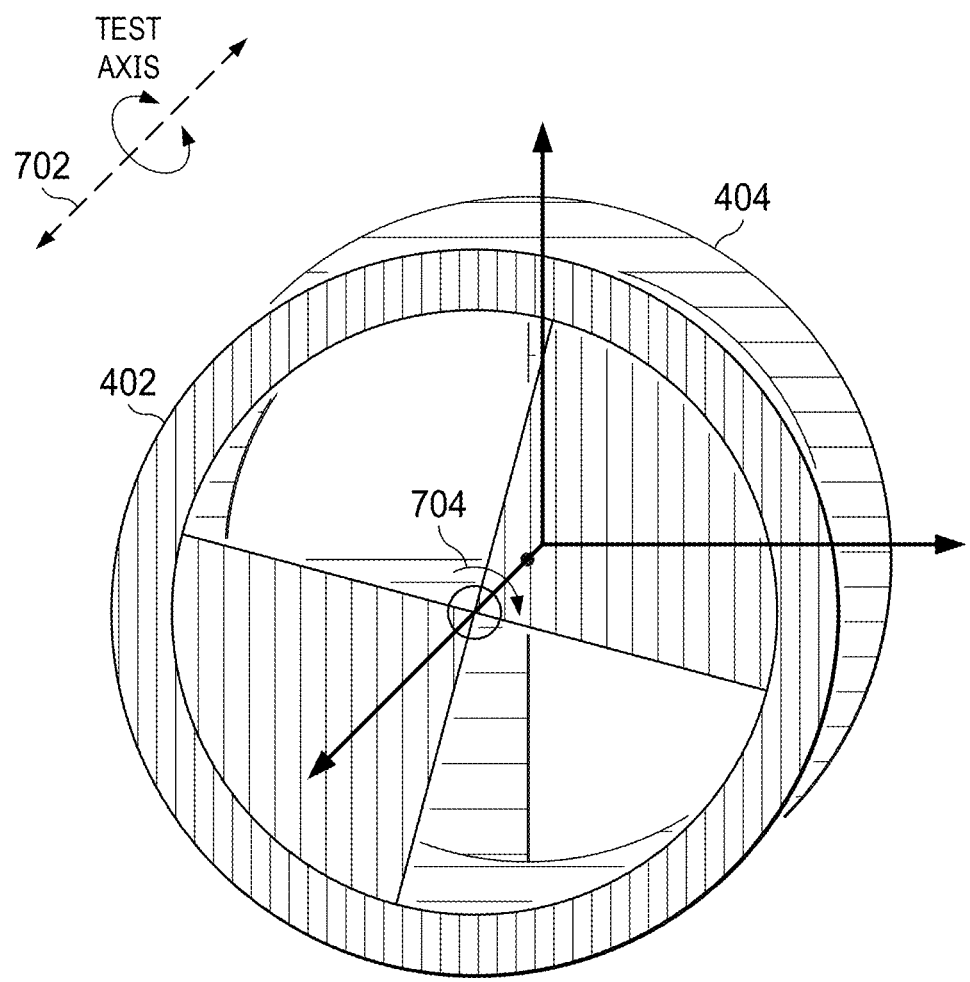
FIG. 7 illustrates a depiction of an example angle offset in accordance with at least one aspect of the disclosure.

FIG. 7 illustrates a depiction of an example orientation displacement angle in accordance with at least one aspect of the disclosure. Specifically, FIG. 7 depicts an orientation displacement angle 704 around a test axis 702. The orientation displacement angle 704 represents an angle of offset between an orientation of the first shape 402 and an orientation of the second shape 404. For example, the orientation may be compared with respect to a forward (longitudinal) direction of a three dimensional environment, such as a forward direction of the test axis 702. It should be appreciated that the first shape 402 and the second shape 404 may be additionally associated with a position offset along the test axis 702 in addition to the orientation displacement angle representing the orientation offset between such shapes, for example the position offset as depicted and discussed with respect to FIGS. 5 or 6.

In some embodiments, in a circumstance where the first shape 402 and the second shape 404 are associated with the orientation displacement angle 704, the shapes are not in perfect alignment, such that there is a visible offset between the orientation of first shape 402 and the orientation of the second shape 404. The orientation offset corresponds to a rotation of the first shape 402, for example as compared to the second shape 404 that remains non-rotated (e.g., at an angle of o) with respect to the test axis 702. In some embodiments, an orientation displacement angle may be determined in addition to the position displacement between a first shape and a second shape. In this regard, a position displacement vector or an orientation displacement angle (e.g., represented as a value or another vector) may each or both be determined based at least in part on comparisons between a same type of reference point, or plurality of reference points, associated with the first shape and the second shape.

In some embodiments, at least one shape is configured to have an adjustable position in the virtual viewpoint of the virtual environment and at least one shape is affixed to a particular position within the virtual viewpoint of the virtual environment. In this regard, an offset may be caused by a difference in rotational angle between position of one or more reference points of the first shape and second shape after or during a movement of an HMD. For example, in some embodiments, a second shape is configured to have an adjustable position in a virtual viewpoint, and the first shape is affixed at a particular position depicted in the virtual viewpoint of the virtual environment. Such an offset may occur during a testing procedure as discussed further herein after a HMD is moved on a test stand to a particular excursion value that is expected to correspond to near-perfect alignment between the shapes. For example, in some embodiments, the adjustment of the second shape within a particular virtual viewpoint occurs during a movement of a HMD from a starting position (e.g., a neutral position) to an excursion position, or from an excursion position back to the starting position. During such times, reference data associated with one or more reference points along or otherwise associated with the first shape or the second shape may be recorded and utilized to determine whether a testing procedure is passed or failed at one or more times in a time series.

In one example context, signals representing movements performed on a test stand are received or monitored via sensors of, or associated with, the simulation apparatus. For example, in some embodiments the signals embody positioning information representing the detected real-world movement of the test stand or the HMD secured to the test stand. In some embodiments, such signals are received throughout the entirety of a performed movement of the test stand. In this regard, such signals may mirror the movements applied to the test stand (e.g., by a test operator or other user). In an ideal context, upon completion of the movement the virtual viewpoint is adjusted such that the first shape and the second shape reach perfect or near-perfect alignment. In some circumstances, the first shape and second shape are expected to reach alignment once a movement of the HMD secured to the test stand to or from an excursion value is completed.

The testing procedure may be performed to measure and quantify how well movements of a virtual viewpoint track movements of a corresponding HMD that controls the virtual viewpoint. For example, the testing procedure may measure and quantify whether changes in a position or orientation of a virtual viewpoint caused by changes in a position or orientation of a HMD due to user movement during simulation accurately reflect a realistic scenario. In this regard, ensuring a sufficient level of fidelity in the movement of the HMD and the corresponding movement of the virtual viewpoint (in a process discussed as viewpoint fidelity testing herein) is desirable to avoid negative effects caused by a mismatch in such movements. Such negative effects may include, for example, motion sickness or an unrealistic experience that may be felt by an operator while wearing the HMD. By using the reference data associated with virtual elements, for example a first shape and a second shape, to detect offset and derive related error values, the temporal quality of the virtualized simulation system may be tested in an objective and comparable manner. Additionally, by allowing for output to one or more displays, some such embodiments further allow for visual confirmation of such testing via human visual analysis. Such advantages are provided while simultaneously minimizing impacts on electrical power usage, minimizing expensive or complex additional components, and utilizing streamlined data analysis techniques to reduce complexity.

Example Viewpoint Fidelity Measure and Test Visualizations

As discussed, as a HMD is moved (e.g., in response to movement of a test stand to which the HMD is secured), at least a position of a second shape in a virtual viewpoint may be adjusted based on updated data received in response to the HMD movement. In some embodiments, an offset between two shapes indicates one or more errors in alignment between the first shape and the second shape at a certain point in the test procedure, for example where such errors indicate problems with operation of an HMD or one or more other hardware, software, or other components of a simulation apparatus.

In this regard, in some contexts, an offset between a first shape and a second shape may be visually depicted and continually change as updates to the first and second shape are depicted (e.g., changing center points or other reference points between the two shapes are updated to indicate an error). The offsets between the first shape and the second shape may be utilized to determine a particular test result indicating whether a test procedure was passed successfully or failed, which may be indicated via data-driven determination or visually. Additionally or alternatively, in some contexts, reference data associated with one or more reference points of the first shape and the second shape may be compared to determine data representing the offset between the two shapes (e.g., a positional displacement vector or orientation displacement angle). At least one error associated with an HMD or other component may be determined based on the data representing the offset (e.g., a HMD movement tracking error based on at least one positional displacement vector or HMD orientation tracking error based on at least one orientation displacement angle). Measuring and testing of such viewpoint fidelity may be performed utilizing such visual verification, data-based verification, or both.

Figure 8:
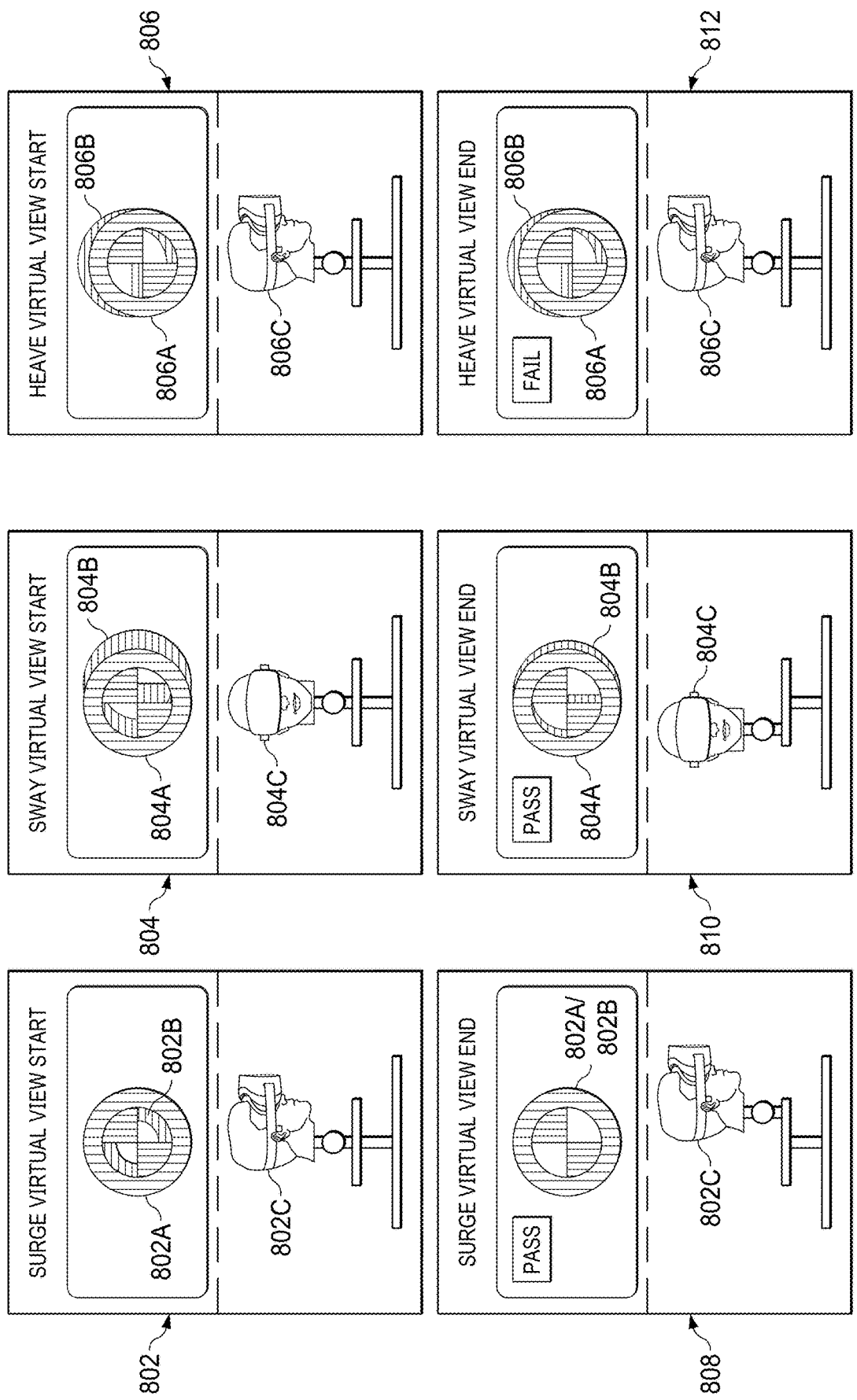
FIG. 8 illustrates a depiction of example viewpoint fidelity tests and test results in accordance with at least one aspect of the disclosure.

FIG. 8 illustrates a depiction of example viewpoint fidelity tests and test results in accordance with at least one aspect of the disclosure. Specifically, FIG. 8 depicts visualizations including renderings of different shapes, including such shapes (e.g., a first shape and a second shape) at starting positions within virtual viewpoints, and such shapes at corresponding positions at a time at which a determination of a test result is performed, during a test procedure for various test axes. The second time may be when the test procedure is triggered to determine at least one test result, such as a test result indicating whether one or more errors from reference data associated with the first shape and second shape are within corresponding thresholds. In some embodiments, a passing test result is determined in circumstances where the errors derived from reference data associated with a first shape and a second shape are within corresponding thresholds, or a failed test result is determined in circumstances where errors derived from reference data associated with a first shape and a second shape are not within the corresponding thresholds.

In some embodiments, the test procedures are performed over a time series of multiple times. For example, reference data for each shape may include positions of reference points at various different times. In some embodiments, a test procedure is determined to have a failed test result in a circumstance where, for a particular time in the time series, an error derived from reference data associated with a first shape and a second shape are not within corresponding thresholds. In some embodiments, once a test completion trigger is detected, a test result is generated for a particular number of times in a time series.

As illustrated, FIG. 8 includes a surge test starting context 802 including, for a surge axis test procedure, a virtual viewpoint with shapes at starting positions and a HMD secured to a test stand and at a starting position along a surge test axis. FIG. 8 further includes a surge test ending context 808 including, for the surge axis test procedure, a virtual viewpoint with the shapes at ending positions and a HMD secured to a test stand and at an ending position along a surge test axis. Additionally, FIG. 8 further includes a sway test starting context 804 similarly including, for a sway axis test procedure, a virtual viewpoint with shapes at starting positions and a HMD secured to a test stand and at a starting position along a sway test axis virtual viewpoint. FIG. 8 further includes a sway test ending context 810 including, for the sway axis test procedure, a virtual viewpoint with the shapes at ending positions and a HMD secured to a test stand and at an ending position along a sway test axis. Additionally, FIG. 8 further includes a heave test starting context 806 similarly including, for a heave axis test procedure, a virtual viewpoint with shapes at starting positions and a HMD secured to a test stand and at a starting position along a heave test axis virtual viewpoint. FIG. 8 further includes a heave test ending context 812 including, for the heave axis test procedure, a virtual viewpoint with the shapes at ending positions and a HMD secured to a test stand and at an ending position along a heave test axis. The visualization depicted in each context may represent a portion of a virtual viewpoint of a virtual environment at a particular time, for example a virtual viewpoint within which a first shape and a second shape are rendered in response to input or output data controlling adjustment of the virtual viewpoint or one or more elements rendered therein.

For each testing procedure, a test stand to which a HMD is secured may be locked for operation only in a particular direction. For example, in some embodiments, the test stand is locked such that movement (e.g., translation or rotation for example) can only occur in the direction of the test axis desired. In this regard, while the test stand is locked, movement may be performed only along the test axis.

In the surge test starting context 802, a HMD 802C mounted to a test stand is depicted facing a surge axis. The test stand is at a starting position. The surge test starting context 802 further depicts a visualization including a first shape 802A at a first starting position and a second shape 802B at a second starting position within the visualization. The first shape 802A and the second shape 802B overlap in alignment, such that the second shape is rendered under (or "behind") the first shape 802A and is partially obscured at the starting positions. The second shape 802B is at least partially visible, however, due to an offset between the first shape 802A and the second shape 802B. For example, in some embodiments the second shape 802B is positioned at a determined offset from the first shape 802A along the surge axis. In this regard, the second shape 802B is depicted further "back" into the virtual environment than the first shape 802A (e.g., such that the second shape 802B appears smaller than the first shape 802A due to a distance in the virtual environment from a camera that captures the virtual viewpoint corresponding to the visualization, for example). The particular determined offset in some embodiments is determined to correspond to a particular movement of the HMD 802C secured to the test stand, for example a movement to a particular excursion value along the surge axis.

The surge test ending context 808 is rendered with respect to a second time associated with the test procedure. For example, in some embodiments, the surge test ending context 808 is captured at a time after a movement of the HMD 802C to the excursion value along the surge axis, as depicted by the position of the HMD 802C secured to the test stand. In response to this movement of the HMD from the position depicted by the HMD 802C from the starting context to the ending context, the virtual viewpoint may similarly be adjusted based on data received from the HMD (e.g., HMD spatial position data).

As depicted in the surge test ending context 808, the first shape 802A is depicted in perfect alignment with the second shape 802B. In this regard, the adjustment of the virtual viewpoint due to movement of the HMD 802C may result in adjustments to the position of the second shape 802B within the virtual viewpoint depicted in the visualization. It should be acknowledged that the adjustment of the position of the second shape 802B in the virtual viewpoint occurs due to movement of the virtual viewpoint itself, and in some embodiments not from any movement of the position of the second shape 802B in the virtual environment itself. In this regard, the first shape 802A may change position in the virtual environment in response to such movements due to its being affixed to the virtual viewpoint, such that the first shape 802A remains in the same position within the virtual viewpoint as the virtual viewpoint is adjusted in the virtual environment. In some embodiments, the visualization depicted in the surge test ending context 808 is captured upon detecting a test completion trigger, for example after receiving a control input from a user or simulation operator or data-driven system. In some embodiments, the visualization depicted is one of a plurality of captured visualizations at different times along a particular movement of an HMD, for example movement of the HMD secured to the test stand from a neutral position to an excursion value. In some embodiments, the test stand is moved to a particular excursion value via a test operator of the simulation apparatus, and in some embodiments the excursion value corresponds to the offset between the first shape 802A and the second shape 802B such that once the HMD position reaches the excursion value, the first shape 802A and the second shape 802B are expected to be aligned in the virtual viewpoint.

As depicted, the second shape 802B is depicted at a second position after the movement. The second shape 802B reaches alignment with the first shape 802A, for example at or significantly close to the position of the first shape 802A within the virtual viewpoint when the second shape 802B is at the second position. It will be appreciated that the first shape 802A may remain at its same starting position within the virtual viewpoint due to it being affixed to the virtual viewpoint. The alignment between the first shape 802A and the second shape 802B makes it such that the second shape 802B is not visible due to being blocked by the first shape 802A.

Reference data associated with a first shape 802A or the second shape 802B may be recorded. In some embodiments, the reference data includes center point positions within the virtual viewpoint for each of the first shape 802A and the second shape 802B. In some embodiments, only the reference data of the first shape 802A may be recorded, as the second shape 802B should remain in an affixed position within the virtual environment. Additionally, in some embodiments, the reference data for the first shape 802A and second shape 802B may be used to generate a positional displacement vector or an orientation displacement angle at a given time. For example, the positional displacement vector or orientation displacement vector may be generated by at least comparing the reference data of the first shape with the reference data of the second shape for a given time. In some embodiments, the positional displacement vector includes data indicating an offset between a position of a reference point of the first shape with a position of a corresponding reference point of the second shape, such as by comparing the position of the first shape (e.g., the second position of the first shape 802A depicted in the visualization of the surge test ending context 808) and the position of the second shape (e.g., the second position of the second shape 802B depicted in the visualization of the surge test ending context 808) in the reference data. Additionally or alternatively, the orientation displacement angle in some embodiments includes data indicating an angle offset between the position of the first shape and the position of the second shape, for example with respect to a test axis. In this regard, the orientation displacement angle is generated from the reference data by comparing at least a position of the same at least one reference point associated with each shape to determine an offset in the orientation (e.g., a rotation) of the first shape 802A to the orientation of the second shape 802B, with respect to a particular test axis.

In some embodiments, one or more errors are determined based on the offset of the reference points of the first shape 802A and second shape 802B. For example, in some embodiments, an HMD movement tracking error is determined based on the positional displacement vector determined representing the positional offset of the shapes. For example, the HMD movement tracking error may include one or more values representing the offset of the first shape 802A from the second shape 802B based on at least one of the distance offsets of positions between center points, top points, bottom points, left points, right points, or one or more other reference points of the two shapes. Additionally or alternatively, in some embodiments, an HMD orientation tracking error is determined based on the orientation displacement angle. For example, the HMD orientation tracking error may include one or more values representing one or more angles of offset between the first shape 802A and the second shape 802B based on at least one of the angles between positions of center points, top points, bottom points, left points, right points, or one or more reference points of the two shapes.

Some embodiments further determine test results, for example test results corresponding to the one or more initiated test procedures, based on the determined one or more errors. For example, in some embodiments, a test result for a test procedure is based on whether a HMD movement tracking error is within a particular threshold, or whether a HMD orientation tracking error is within a particular threshold. In some embodiments, a test procedure is passed (e.g., a test result embodying a passed result is raised) in a circumstance where a HMD movement tracking error and a HMD orientation tracking error are both within corresponding thresholds. Similarly, in some embodiments, a test procedure is failed (e.g., a test result embodying a failed result is raised) in a circumstance where the HMD movement tracking error is not within a corresponding threshold, or the HMD orientation tracking error is not within a corresponding threshold, or both are not within their corresponding thresholds.

In some embodiments, for example where reference data includes multiple portions of reference data representing data recorded across different times in a particular time series, a test procedure is failed in a circumstance where failed results are raised corresponding to a particular number, particular percentage, or particular threshold number of portions of reference data for such times. For example, in some embodiments, a failed test result for a test procedure is raised in a circumstance where portions of reference data associated with X consecutive times each are determined to indicate a failed test result, where X is a number greater than or equal to 1. X may be a threshold number of time frames for a particular system that is set by a user, predetermined, or otherwise set. In some embodiments, X represents a number of time frames that, if an offset is detected between shapes, a human may be negatively affected by visual disparities in a virtual viewpoint of a virtual environment between a rendered position and an intended position based on recorded data.

As illustrated in the surge test ending context 808, the test procedure raises a passed test result. In this regard, the offsets between the first shape 802A at the second position and the second shape 802B positioned behind the first shape 802A at the second position satisfies one or more corresponding thresholds. For example, as illustrated the positional and angular offsets between the first shape 802A and the second shape 802B are zero or near-zero, such that the corresponding HMD movement tracking error or HMD orientation tracking error may similarly be minimal and satisfy many thresholds.

This test procedure may be repeated for any test axis, and any number of test axes. For example, as illustrated, FIG. 8 includes a sway test starting context 804 for a sway test procedure, which similarly depicts representations of a first shape and a second shape in a visualization of a virtual viewpoint based on a HMD. Specifically, the second shape 804B is slightly offset from the first shape 804A (e.g., such that the second shape 804B is partially visible to the user as the second shape 804B is blocked by the first shape 802A). Specifically, the sway test starting context 804 includes the first shape 804A at a starting position, with the second shape 804B depicted at a different starting position, within the virtual viewpoint depicted in the visualization.

In the sway test starting context 804, a HMD 804C mounted to a test stand is depicted facing a sway axis. The test stand is at a starting position. The sway test starting context 804 further depicts a visualization including a first shape 804A at a first starting position and a second shape 804B at a second starting position within the visualization. The first shape 804A and the second shape 804B overlap in alignment, such that the second shape 804B is partially rendered under (or "behind") the first shape 804A and is partially obscured at the starting positions. The second shape 804B is at least partially visible, however, due to an offset between the first shape 804A and the second shape 804B along the sway test axis, specifically with the second shape 804B offset to the right of the first shape 804A in the sway test starting context 804. For example, in some embodiments the second shape 804B is positioned at a determined offset from the first shape 804A along the sway axis. In this regard, the second shape 804B is depicted further to the right in the virtual viewpoint of the virtual environment than the first shape 804A. The particular determined offset in some embodiments is determined to correspond to a particular movement of the HMD 804C secured to the test stand, for example a movement to a particular excursion value along the sway axis.

The sway test ending context 810 is rendered with respect to a second time associated with the test procedure. For example, in some embodiments, the sway test ending context 810 is captured at a time after a movement of the HMD 804C to the excursion value along the sway axis, as depicted by the position of the HMD 804C secured to the test stand. In response to this movement of the HMD from the position depicted by the HMD 804C from the starting context to the ending context, the virtual viewpoint may similarly be adjusted based on data received from the HMD (e.g., HMD spatial position data).

As depicted in the sway test ending context 810, the first shape 804A is depicted in near-perfect alignment with, but still slightly from, the second shape 804B. In this regard, the slight offset between the first shape 804A and the second shape 804B results in at least a portion of the second shape 804B remaining visible. The adjustment to the position of the second shape 804B in the virtual viewpoint may have resulted from a movement of the HMD 804C. For example, movement of the HMD 804C may be utilized to adjust the virtual viewpoint depicted and result in adjustments to the position of the second shape 804B within the virtual viewpoint as depicted in the visualization. It should be acknowledged that the adjustment of the position of the second shape 804B in the virtual viewpoint occurs due to movement of the virtual viewpoint itself, and in some embodiments not from any movement of the position of the second shape 804B in the virtual environment itself. In this regard, the first shape 804A may change position in the virtual environment in response to such movements due to its being affixed to the virtual viewpoint, such that the first shape 804A remains in the same position within the virtual viewpoint as the virtual viewpoint is adjusted in the virtual environment.

In some embodiments, the visualization depicted in the sway test ending context 810 is captured upon detecting a test completion trigger, for example after receiving a control input from a user or simulation operator or data-driven system. In some embodiments, the visualization depicted is one of a plurality of captured visualizations at different times along a particular movement of an HMD, for example movement of the HMD secured to the test stand from a neutral position to an excursion value. In some embodiments, the test stand is moved to a particular excursion value via a test operator or other user of a simulation apparatus, and in some embodiments the excursion value corresponds to the offset between the first shape 804A and the second shape 804B such that once the HMD 804C position reaches the excursion value, the first shape 804A and the second shape 804B are expected to be aligned in the virtual viewpoint.

Reference data associated with a first shape 804A or the second shape 804B may be recorded. In some embodiments, the reference data includes center point positions within the virtual viewpoint for each of the first shape 804A and the second shape 804B. In some embodiments, only the reference data of the first shape 804A may be recorded, as the second shape 804B should remain in an affixed position within the virtual environment. Additionally, in some embodiments, the reference data for the first shape 804A and second shape 804B may be used to generate a positional displacement vector or an orientation displacement angle at a given time. For example, the positional displacement vector or orientation displacement vector may be generated by at least comparing the reference data of the first shape with the reference data of the second shape for a given time. In some embodiments, the positional displacement vector includes data indicating an offset between a position of a reference point of the first shape with a position of a corresponding reference point of the second shape, such as by comparing the position of the first shape (e.g., the second position of the first shape 804A depicted in the visualization of the sway test ending context 810) and the position of the second shape (e.g., the second position of the second shape 804B depicted in the visualization of the sway test ending context 810) in the reference data. Additionally or alternatively, the orientation displacement angle in some embodiments includes data indicating an angle offset between the position of the first shape and the position of the second shape, for example with respect to a test axis. In this regard, the orientation displacement angle is generated from the reference data by comparing at least a position of the same at least one reference point associated with each shape to determine an offset in the orientation (e.g., a rotation) of the first shape 804A to the orientation of the second shape 804B, with respect to a particular test axis.

In some embodiments, one or more errors are determined based on the offset of the reference points of the first shape 804A and second shape 804B. For example, in some embodiments, an HMD movement tracking error is determined based on the positional displacement vector determined representing the positional offset of the shapes. For example, the HMD movement tracking error may include one or more values representing the offset of the first shape 804A from the second shape 804B based on at least one of the distance offsets of positions between center points, top points, bottom points, left points, right points, or one or more other reference points of the two shapes. Additionally or alternatively, in some embodiments, an HMD orientation tracking error is determined based on the orientation displacement angle. For example, the HMD orientation tracking error may include one or more values representing one or more angles of offset between the first shape 804A and the second shape 804B based on at least one of the angles between positions of center points, top points, bottom points, left points, right points, or one or more reference points of the two shapes.

Some embodiments further determine test results, for example test results corresponding to the one or more initiated test procedures, based on the determined one or more errors. For example, in some embodiments, a test result for a test procedure is based on whether a HMD movement tracking error is within a particular threshold, or whether a HMD orientation tracking error is within a particular threshold. In some embodiments, a test procedure is passed (e.g., a test result embodying a passed result is raised) in a circumstance where a HMD movement tracking error and a HMD orientation tracking error are both within corresponding thresholds. Similarly, in some embodiments, a test procedure is failed (e.g., a test result embodying a failed result is raised) in a circumstance where the HMD movement tracking error is not within a corresponding threshold, or the HMD orientation tracking error is not within a corresponding threshold, or both are not within their corresponding thresholds.

In some embodiments, for example where reference data includes multiple portions of reference data representing data recorded across different times in a particular time series, a test procedure is failed in a circumstance where failed results are raised corresponding to a particular number, particular percentage, or particular threshold number of portions of reference data for such times. For example, in some embodiments, a failed test result for a test procedure is raised in a circumstance where portions of reference data associated with X consecutive times each are determined to indicate a failed test result, where X is a number greater than or equal to 1. X may be a threshold number of time frames for a particular system that is set by a user, predetermined, or otherwise set. In some embodiments, X represents a number of time frames that, if an offset is detected between shapes, a human may be negatively affected by visual disparities in a virtual viewpoint of a virtual environment between a rendered position and an intended position based on recorded data.

As illustrated in the sway test ending context 810, the test procedure raises a passed test result. In this regard, the offsets between the first shape 804A at the second position and the second shape 804B at its second position satisfies one or more corresponding thresholds. For example, as illustrated the positional and angular offsets between the first shape 804A and the second shape 804B remain small, such that the corresponding HMD movement tracking error or HMD orientation tracking error may similarly be small and satisfy several thresholds.

FIG. 8 further includes a heave test starting context 806 for a heave test procedure, which similarly depicts representations of a first shape and a second shape in a visualization of a virtual viewpoint based on a HMD. Specifically, the second shape 806B is depicted with a determined offset from the first shape 806A, but is partially aligned (e.g., such that a part of the second shape 804B is not visible to the user as blocked by the first shape 806A). Specifically, heave test starting context 806 includes the first shape 806A at a starting position, with the second shape 806B depicted at its own, different starting position.

In the heave test starting context 806, a HMD 806C mounted to a test stand is depicted facing a heave axis. The test stand is at a starting position. The heave test starting context 806 further depicts a visualization including a first shape 806A at a first starting position and a second shape 806B at a second starting position within the visualization. The first shape 806A and the second shape 806B overlap in alignment, such that the second shape 806B is partially rendered under (or "behind") the first shape 806A and is partially obscured at the starting positions. The second shape 806B is at least partially visible, however, due to an offset between the first shape 806A and the second shape 806B along the heave test axis, specifically with the second shape 806B offset to the top side of the first shape 806A in the heave test starting context 806. For example, in some embodiments the second shape 806B is positioned at a determined offset from the first shape 806A along the heave axis. In this regard, the second shape 806B is depicted further above in the virtual viewpoint of the virtual environment than the first shape 806A. The particular determined offset in some embodiments is determined to correspond to a particular movement of the HMD 806C secured to the test stand, for example a movement to a particular excursion value along the heave axis.

The heave test ending context 812 is rendered with respect to a second time associated with the test procedure. For example, in some embodiments, the heave test ending context 812 is captured at a time after a movement of the HMD 806C to the excursion value along the heave axis, as depicted by the position of the HMD 806C secured to the test stand. In response to this movement of the HMD from the position depicted by the HMD 806C from the starting context to the ending context, the virtual viewpoint may similarly be adjusted based on data received from the HMD (e.g., HMD spatial position data).

As depicted in the heave test ending context 812, the first shape 806A is depicted with a more significant and visible offset from the second shape 806B. In this regard, the noticeable offset between the first shape 806A and the second shape 806B results in a larger portion of the second shape 806B remaining visible. The adjustment to the position of the second shape 806B in the virtual viewpoint may have resulted from a movement of the HMD 806C. For example, movement of the HMD 806C may be utilized to adjust the virtual viewpoint depicted and result in adjustments to the position of the second shape 806B within the virtual viewpoint as depicted in the visualization. It should be acknowledged that the adjustment of the position of the second shape 806B in the virtual viewpoint occurs due to movement of the virtual viewpoint itself, and in some embodiments not from any movement of the position of the second shape 806B in the virtual environment itself. In this regard, the first shape 806A may change position in the virtual environment in response to such movements due to its being affixed to the virtual viewpoint, such that the first shape 806A remains in the same position within the virtual viewpoint as the virtual viewpoint is adjusted in the virtual environment.

In some embodiments, the visualization depicted in the heave test ending context 812 is captured upon detecting a test completion trigger, for example after receiving a control input from a user or simulation operator or data-driven system. In some embodiments, the visualization depicted is one of a plurality of captured visualizations at different times along a particular movement of an HMD, for example movement of the HMD secured to the test stand from a neutral position to an excursion value. In some embodiments, the test stand is moved to a particular excursion value via a test operator or other user of a simulation apparatus, and in some embodiments the excursion value corresponds to the offset between the first shape 806A and the second shape 806B such that once the HMD 806C position reaches the excursion value, the first shape 806A and the second shape 806B are expected to be aligned in the virtual viewpoint.

Reference data associated with a first shape 806A or the second shape 806B may be recorded. In some embodiments, the reference data includes center point positions within the virtual viewpoint for each of the first shape 806A and the second shape 806B. In some embodiments, only the reference data of the first shape 806A may be recorded, as the second shape 806B should remain in an affixed position within the virtual environment. Additionally, in some embodiments, the reference data for the first shape 806A and second shape 806B may be used to generate a positional displacement vector or an orientation displacement angle at a given time. For example, the positional displacement vector or orientation displacement vector may be generated by at least comparing the reference data of the first shape with the reference data of the second shape for a given time. In some embodiments, the positional displacement vector includes data indicating an offset between a position of a reference point of the first shape with a position of a corresponding reference point of the second shape, such as by comparing the position of the first shape (e.g., the second position of the first shape 806A depicted in the visualization of the heave test ending context 812) and the position of the second shape (e.g., the second position of the second shape 806B depicted in the visualization of the heave test ending context 812) in the reference data. Additionally or alternatively, the orientation displacement angle in some embodiments includes data indicating an angle offset between the position of the first shape and the position of the second shape, for example with respect to a test axis. In this regard, the orientation displacement angle is generated from the reference data by comparing at least a position of the same at least one reference point associated with each shape to determine an offset in the orientation (e.g., a rotation) of the first shape 804A to the orientation of the second shape 804B, with respect to a particular test axis.

In some embodiments, one or more errors are determined based on the offset of the reference points of the first shape 806A and second shape 806B. For example, in some embodiments, an HMD movement tracking error is determined based on the positional displacement vector determined representing the positional offset of the shapes. For example, the HMD movement tracking error may include one or more values representing the offset of the first shape 806A from the second shape 806B based on at least one of the distance offsets of positions between center points, top points, bottom points, left points, right points, or one or more other reference points of the two shapes. Additionally or alternatively, in some embodiments, an HMD orientation tracking error is determined based on the orientation displacement angle. For example, the HMD orientation tracking error may include one or more values representing one or more angles of offset between the first shape 806A and the second shape 806B based on at least one of the angles between positions of center points, top points, bottom points, left points, right points, or one or more reference points of the two shapes.

Some embodiments further determine test results, for example test results corresponding to the one or more initiated test procedures, based on the determined one or more errors. For example, in some embodiments, a test result for a test procedure is based on whether a HMD movement tracking error is within a particular threshold, or whether a HMD orientation tracking error is within a particular threshold. In some embodiments, a test procedure is passed (e.g., a test result embodying a passed result is raised) in a circumstance where a HMD movement tracking error and a HMD orientation tracking error are both within corresponding thresholds. Similarly, in some embodiments, a test procedure is failed (e.g., a test result embodying a failed result is raised) in a circumstance where the HMD movement tracking error is not within a corresponding threshold, or the HMD orientation tracking error is not within a corresponding threshold, or both are not within their corresponding thresholds.

In some embodiments, for example where reference data includes multiple portions of reference data representing data recorded across different times in a particular time series, a test procedure is failed in a circumstance where failed results are raised corresponding to a particular number, particular percentage, or particular threshold number of portions of reference data for such times. For example, in some embodiments, a failed test result for a test procedure is raised in a circumstance where portions of reference data associated with X consecutive times each are determined to indicate a failed test result, where X is a number greater than or equal to 1. X may be a threshold number of time frames for a particular system that is set by a user, predetermined, or otherwise set. In some embodiments, X represents a number of time frames that, if an offset is detected between shapes, a human may be negatively affected by visual disparities in a virtual viewpoint of a virtual environment between a rendered position and an intended position based on recorded data.

As illustrated in heave test ending context 812, the test procedure raises a failed test result. In this regard, the offsets between the first shape 806A as affixed and the second shape 806B at its second position fails to satisfy one or more corresponding thresholds. For example, as illustrated, the errors derived from the positional and angular offsets do not satisfy one or more corresponding thresholds. As illustrated, the positional or angular offsets may be sufficiently large such that corresponding HMD movement tracking error or HMD orientation tracking error exceed or otherwise fail to satisfy one or more thresholds. In some examples, the HMD movement tracking error (e.g., derived from a positional displacement vector representing such an offset) may exceed a threshold that represents an acceptable amount of offset between one or more reference points of the first shape 806A and one or more reference points of the second shape 806B.

In some embodiments, the failed test results is associated with the second time, and one or more other test results may be raised with respect to other times. For example, in some embodiments the test procedure is run for reference data associated with a plurality of times, and a test result is raised for each individual time of the plurality of times. The test procedure for the overall simulation may depend on the test result raised for each individual time, for example where a test procedure raises an overall failure result if sub-test procedures raise a failed test result for a certain number of continuous times, a failed test result is raised for a certain portion of times, or the like. In other embodiments, a test procedure is considered to raise a failed test result where data associated with any time raises a failed test result for any sub-test procedure.

Figure 9:
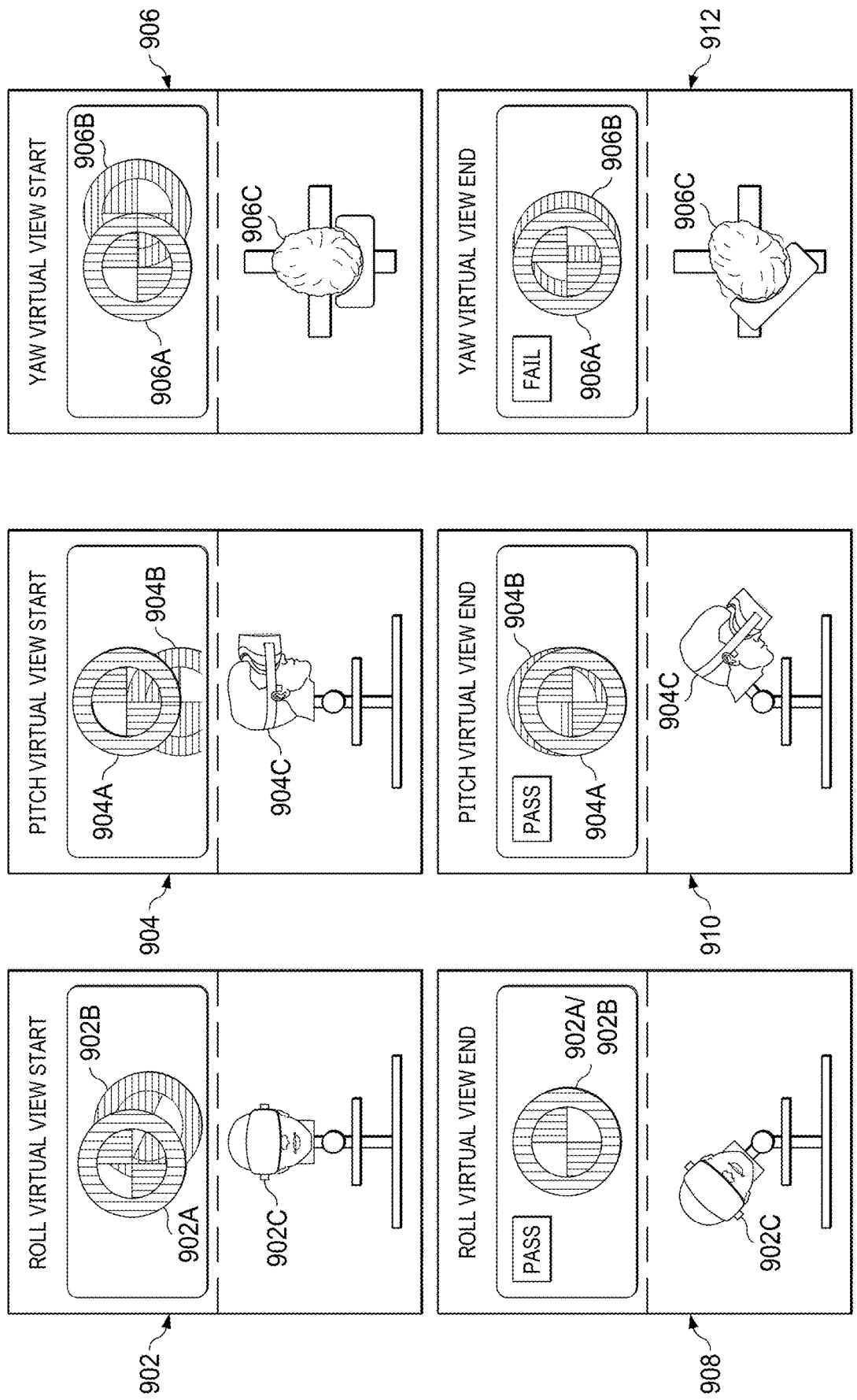
FIG. 9 illustrates a depiction of additional example viewpoint fidelity tests and tests results in accordance with at least one aspect of the disclosure.

FIG. 9 illustrates a depiction of additional example viewpoint fidelity tests and tests results in accordance with at least one aspect of the disclosure. Specifically, FIG. 9 depicts visualizations including renderings of different shapes, including such shapes (e.g., a first shape and a second shape) at starting positions within virtual viewpoints, and such shapes at corresponding positions at a time at which a determination of a test result is performed, during a test procedure for various additional test axes.

FIG. 9 includes a roll test starting context 902 including, for a roll axis test procedure, a virtual viewpoint with shapes at starting positions and a HMD secured to a test stand and at a starting position along a roll test axis. FIG. 9 further includes a roll test ending context 908 including, for the roll axis test procedure, a virtual viewpoint with the shapes at ending positions and a HMD secured to a test stand and at an ending position along a roll test axis. Additionally, FIG. 9 further includes a pitch test starting context 904 similarly including, for a pitch axis test procedure, a virtual viewpoint with shapes at starting positions and a HMD secured to a test stand and at a starting position along a pitch test axis virtual viewpoint. FIG. 9 further includes a pitch test ending context 910 including, for the pitch axis test procedure, a virtual viewpoint with the shapes at ending positions and a HMD secured to a test stand and at an ending position along a pitch test axis. Additionally, FIG. 9 further includes a yaw test starting context 906 similarly including, for a yaw axis test procedure, a virtual viewpoint with shapes at starting positions and a HMD secured to a test stand and at a starting position along a yaw test axis virtual viewpoint. FIG. 9 further includes a yaw test ending context 912 including, for the yaw axis test procedure, a virtual viewpoint with the shapes at ending positions and a HMD secured to a test stand and at an ending position along a yaw test axis. The visualization depicted in each context may represent a portion of a virtual viewpoint of a virtual environment at a particular time, for example a virtual viewpoint within which a first shape and a second shape are rendered in response to input or output data controlling adjustment of the virtual viewpoint or one or more elements rendered therein.

The testing procedures for the roll, pitch, and yaw axes depicted with respect to FIG. 9 are performed similarly to the surge, sway, and heave axes depicted and discussed with respect to FIG. 8. Specifically, the roll testing procedure discussed with respect to the roll test starting context 902 and roll test ending context 908 result in a passed test result due to minimal to no offset, similar to the surge testing procedure discussed with respect to the surge test starting context 802 and surge test ending context 808 in FIG. 8. Similarly, the pitch testing procedure discussed with respect to the pitch test starting context 904 and the pitch test ending context 910 result in a passed test result due to the slight-but-still-minimal offset, similar to the sway testing procedure discussed with respect to the sway test starting context

804 and sway test ending context 810 in FIG. 8. Similarly still, the yaw testing procedure discussed with respect to the yaw test starting context 906 and the yaw test ending context 912 result in a failed test result due to the more significant offset, similar to the heave testing procedure discussed with respect to the heave test starting context 806 and the heave test ending context 812 in FIG. 9. The difference between such testing procedures merely includes the test axis along which the determined offset between the first shape and second shape is configured, and the movement of the HMD is performed. Additional detailed discussion regarding the roll, pitch, and yaw test procedures specifically is thus not duplicated.

In some embodiments, a test result raised for a particular test axis is output via one or more displays. For example, in some embodiments the test result is output to the display of a HMD. Additionally or alternatively, in some embodiments, the test result is output to a separate display, for example a first additional display associated with a simulation instructor, or a second additional display associated with an operator of a simulation (e.g., a simulation student). In some embodiments, an error message is output when a failed test result.

Example Processes of the Disclosure

Some embodiments are configured to perform one or more processes for measuring viewpoint fidelity with motion of a head mounted display. For example, in some embodiments, the processes define test procedures for measuring viewpoint fidelity, or determining test results for such test procedures based on measured values associated with viewpoint fidelity. Flowcharts are provided herein that define such processes.

In some embodiments, the processes discussed herein define a computer-implemented method. For example, the computer-implemented method may be executed utilizing one or more computing elements, for example where the computer-implemented method is executed by at least one processor. In some embodiments, at least one of the processes discussed herein is performed by an apparatus or device, for example an apparatus embodying a simulation host system, image generation system, or head mounted device as depicted and described herein. For example, in some embodiments, at least one of the processes discussed herein is performed by an apparatus including at least one non-transitory memory and at least one processor that executes computer instructions stored on the at least one memory to cause the apparatus to perform the at least one process. In some embodiments, at least one non-transitory computer-readable medium stores computer instructions stored thereon that, in execution with at least one processor, is configured to perform at least one of the processes discussed herein. In some embodiments a process is performed by the apparatus 350, alone or in conjunction with the apparatus 300, as depicted and described herein.

The processes discussed herein include operational blocks defining each step of the flowchart. It should be appreciated that the depicted flow represents an example order of the steps in the flow. In other embodiments, one or more operational blocks may come before or after one of the other operational blocks as depicted, such that the order of the steps performed differs from that depicted. In this regard, it will be appreciated that different embodiments may perform the steps depicted in the operational blocks of the flowcharts in one or more alternative order without deviating from the scope and spirit of this disclosure and the following claims.

Optional operational blocks are depicted in dashed (or "broken") lines. In some embodiments, at least one of the optional operational blocks is performed. In some embodiments, all of the optional operational blocks are performed. In other embodiments, at least one of the operational blocks is not performed. In this regard, it should be appreciated that different embodiments as discussed herein may include different optional operations corresponding to the operational blocks depicted and described herein.

Figure 10:
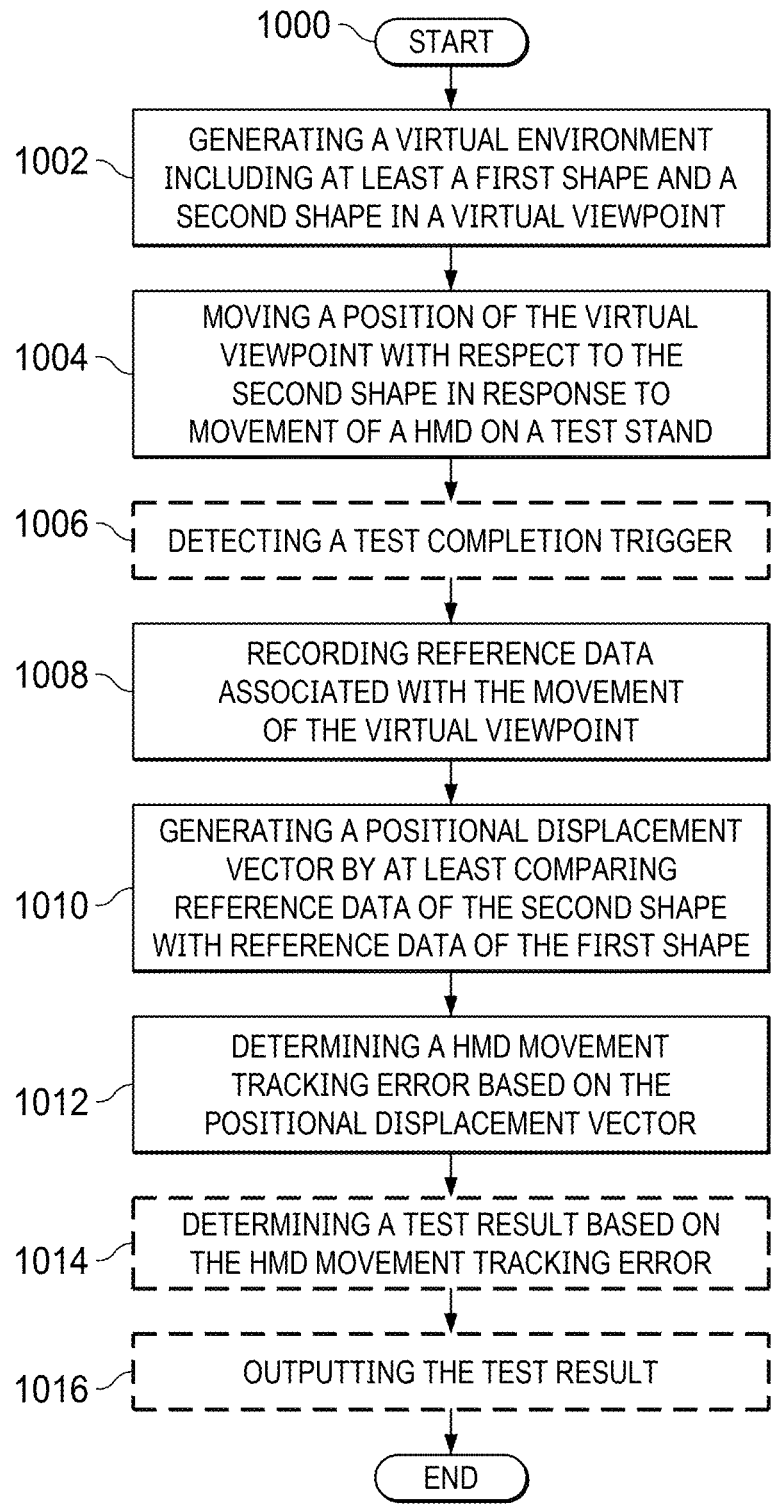
FIG. 10 illustrates a flowchart depicting operations of an example process for performing at least one test of HMD viewpoint fidelity in accordance with at least one aspect of the disclosure.

FIG. 10 illustrates a flowchart depicting operations of an example process for performing at least one test of HMD viewpoint fidelity in accordance with at least one aspect of the disclosure. Specifically, FIG. 10 depicts an example process 1000. In some embodiments, the process 1000 is performed by a simulation host system or an image generation system in communication with a head mounted device. For example, in some embodiments the process 1000 is performed by such devices alone, or in conjunction with one another, as depicted and described with respect to FIG. 1.

At operation 1002, the process 1000 includes generating a virtual environment. The virtual environment includes at least a first shape and a second shape in a virtual viewpoint. In some embodiments, the first shape is in front of the second shape in the virtual viewpoint. The second shape is configured to adjust its position in the virtual viewpoint as the virtual viewpoint adjusts, for example in response to movement of a HMD as depicted and described herein. In some embodiments, the second shape is positioned behind the first shape, and the first shape is affixed in the virtual viewpoint of the virtual environment. In this regard, the position within the virtual viewpoint of the first shape remains the same even as the virtual viewpoint associated with the virtual environment is adjusted. In some embodiments, the process 1000 includes causing outputting of the virtual environment to the HMD, for example to cause the HMD to render a virtual viewpoint of the virtual environment to at least one display of the HMD.

Additionally, in some embodiments, the virtual viewpoint of the virtual environment is configured to adjust in response to movement of a HMD secured to a test stand. For example, in some embodiments the virtual viewpoint corresponds to a captured representation of a virtual camera positioned within the virtual environment. The virtual camera is intended to function as a view of a user, where movements of the virtual camera mirror movements of the HMD via the test stand as a proxy for head mounted control of a user's view in the virtual environment. The test stand may be locked for movement along a particular test axis.

The second shape is positioned in the virtual environment at a determined offset from the first shape along a test axis. In this regard, the virtual viewpoint may include the first shape rendered with all or at least some of the second shape visible behind, next to, or otherwise offset from the first shape. The first shape may block at least a portion of the second shape from being visible within the rendering of the virtual viewpoint. In some embodiments, the determined offset at which the second shape is rendered corresponds to an expected movement in response to a movement of a HMD to an excursion value. In this regard, as the virtual viewpoint is adjusted (e.g., in response to movement of the HMD as discussed), the first shape may be brought closer to alignment with the second shape within the virtual viewpoint.

At operation 1004, the process 1000 includes moving a position of the virtual viewpoint with respect to the second shape in response to movement of a HMD on a test stand. For example, in some embodiments, the process 1000 includes receiving HMD spatial position data in response to movement applied by a test operator to the test stand or the HMD on the test stand. The HMD spatial position data may be received from sensors of the HMD itself, sensors external to the HMD that monitor the HMD or a simulation apparatus, or both. The movement may adjust the HMD from a first position to a second position along the test axis, for example from a neutral point along the test axis to an excursion value along the test axis, or from the excursion value to a neutral point along the test axis. In some embodiments, the HMD spatial position data from the HMD itself as such movement occurs, or upon completion of the movement.

In some embodiments, the sensors of the HMD are utilized to receive continuous HMD spatial position data associated with the HMD, for example where the HMD spatial position data is received for multiple times in a time series. In some embodiments, the HMD spatial position data includes or embodies sensor data or other data indicating a change of position of the HMD, for example a translation or rotation. The change in position may correspond to an initiated movement of the test stand, for example via a test operator. In some embodiments, the HMD spatial position data is received from one or more sensors onboard the HMD itself. In some embodiments, at least some of the HMD spatial position data is received from one or more other sensors external to the HMD and associated with monitoring the HMD.

In some embodiments, the process 1000 includes moving the position of the virtual viewpoint by adjusting it based on the received data. For example, in some embodiments, the virtual viewpoint is updated to reflect the movement represented in the HMD spatial position data. In one example context, a virtual camera that captures the virtual viewpoint may be updated an amount represented by or otherwise derived from the HMD spatial position data. The first shape may remain affixed with respect to the virtual viewpoint regardless of such adjustments due to movement. In this regard, it should be appreciated that the movement of the virtual viewpoint may adjust the position of the second shape within the virtual viewpoint without adjusting the position of the first shape within the virtual viewpoint, which remains fixed.

At operation 1006, the process 1000 optionally includes detecting a test completion trigger. The test completion trigger indicates a request to begin determination of a test result. In some embodiments, the test completion trigger includes a gesture, control input, or other specially-defined user interaction. For example, in some embodiments a user interacts with a user interface control or peripheral to provide input embodying the test completion trigger, for example at a time where a user initiates the process for determining at least one test result at or near completion of a movement of the test stand to which the HMD is secured. In some embodiments, the test completion trigger is detected as a result of a software or data-driven determination. For example, in some embodiments, the test completion trigger is detected in response to a timer controlling a rate at which test results are determined during a test procedure. In other embodiments, a different check is performed that, when satisfied, indicates detection of a test completion trigger. In some embodiments, the test completion trigger is detectable at any point along the movement of the HMD that results in the adjusting of the virtual viewpoint, for example as discussed with respect to operation 1004.

At operation 1008, the process 1000 includes recording reference data associated with the moving of the position of the virtual viewpoint. In some embodiments, the reference data indicates at least a reference position of the second shape at one or more times throughout the movement, for example a position of at least one reference position within the virtual environment or the virtual viewpoint of the virtual environment. Additionally or alternatively, in some embodiments, the reference data includes at least a reference position of a first shape at one or more times throughout the movement. In some embodiments, the reference position includes a position of a center point of a particular shape, a corner point of a cutout portion of the shape, a top point of the shape, a left point of the shape, a right point of the shape, a bottom point of the shape, or any other determined point of or otherwise associated with the shape. The reference data may include reference positions corresponding to the reference points as the second shape is adjusted in the virtual viewpoint throughout movement of the HMD resulting from initiated movement of the test stand.

At operation 1010, the process 1000 includes generating a positional displacement vector. The positional displacement vector represents an offset in a position of a first shape and a second shape in the virtual environment, such as based on coordinates representing positions of the at least one reference point. For example, in some embodiments, the positional displacement vector is generated by at least comparing the reference data of the second shape with reference data of the first shape. In some embodiments, the reference data for the second shape is predetermined or otherwise static, for example due to the first shape being at an affixed position within the virtual environment. The reference data for each shape may include positions of the same type of reference point, such that the positions of a particular reference point may be compared to determine an offset associated with the reference point.

In some embodiments, the positional displacement vector is one of a plurality of positional displacement vectors. For example, in some embodiments, the plurality of positional displacement vectors represents a series of positional displacement vectors associated with a plurality of times in a time series. Each time may correspond to a different excursion value. In this regard, each positional displacement vector of the plurality of positional displacement vectors may be processed for a particular time, as discussed herein.

At operation 1012, the process 1000 includes determining a HMD movement tracking error. In some embodiments, the HMD movement tracking error is determined based on the positional displacement vector generated for the first shape and the second shape. In some embodiments, the HMD movement tracking error represents a magnitude of the offset as represented by the positional displacement vector. In some embodiments, any other error determination formula may be used to determine the HMD movement tracking error from the positional displacement vector.

At operation 1014, the process 1000 optionally includes determining a test result. The test result may be one of a test passed result or a test failed result. In some embodiments, the test result is determined based on the HMD movement tracking error. For example, in some embodiments, the test result is determined by comparing the HMD movement tracking error with at least one threshold. In some such embodiments, the test result is determined to be the test passed result in a circumstance where the HMD movement tracking error does not exceed (or otherwise satisfies) the threshold. The test result is determined to be a test failed result in a circumstance where the HMD movement tracking error exceeds (or otherwise does not satisfy) the threshold. The threshold may be set by a user, automatically determined, predetermined, or otherwise set using an automatic or manual mechanism. In some embodiments, a threshold corresponding to a HMD movement tracking error is set to a particular distance, for example 2 inch (or any other measurement, such as 1 inch, 1.5 inch, or the like), that is determined a sufficient offset to not negatively impact a user. In some embodiments, a threshold corresponding to a HMD orientation tracking error is set to a particular angle, for example 5 degrees (or any other angle, such as 4 degrees, 3 degrees, or the like), that is determined to be a satisfactory rotation to not negatively impact a user.

Additionally or alternatively, in some embodiments, the test result is determined based on data associated with multiple times of a time series. For example, in some embodiments, multiple HMD movement tracking errors are determined based on multiple reference data portions corresponding to multiple times of a time series. A sub-test result may be determined for each time of the time series. The test result for the process 1000 may then be determined based on the combination of the sub-test results.

At operation 1016, the process 1000 optionally includes outputting the test result. In some embodiments, the test result is output to at least one display by rendering a label, image, or other visual data that is configured based on the test result. For example, in some embodiments, the test result is output in a first color, first text label (e.g., a "pass" label), first image (e.g., a checkmark indicating a passed test result), or the like in a circumstance where the test result includes a test passed result. The test result is output in a second color, second text label (e.g., a "fail" label), a second image (e.g., an X indicating a failed test result), or the like in a circumstance where the test result includes a test failed result. In some embodiments, the process 1000 determines sub-test results for various times of a time series, and only outputs a test result for a particular time (e.g., upon a determining a failed test result when a threshold number of continuous times are associated with a failed test result). In some embodiments, the test result is output via rendering within the virtual viewpoint of the virtual environment. In some embodiments, the test result is output to multiple displays, as discussed further herein.

In some embodiments, the process 1000 may be repeated for any number of additional test axes. For example, in some embodiments, for at least one additional test axis, the steps 1002 through 1016 may be repeated. In this regard, an additional virtual environment may be generated for an additional test axis. Additional moving of a position of the second shape in the additional virtual environment is performed in response to movement of the HMD on a test stand. Additional reference data associated with the additional movement of the virtual viewpoint may be recorded. An additional positional displacement vector may be generated by at least comparing additional reference data of the second shape with additional reference data of the first shape. An additional HMD movement tracking error based on the positional displacement vector, where the additional HMD movement tracking error is associated with the additional test axis. Additionally or alternatively, in some embodiments, an additional test completion trigger may be detected. An additional test result (e.g., corresponding to the additional test axis) may be determined based on the additional HMD movement tracking error. The additional test result may then be outputted. Each of these steps may be performed in a manner similar to that discussed with respect to the steps of the process 1000, with the difference being that each data portion is associated with a different, additional test axis being tested.

Figure 11:
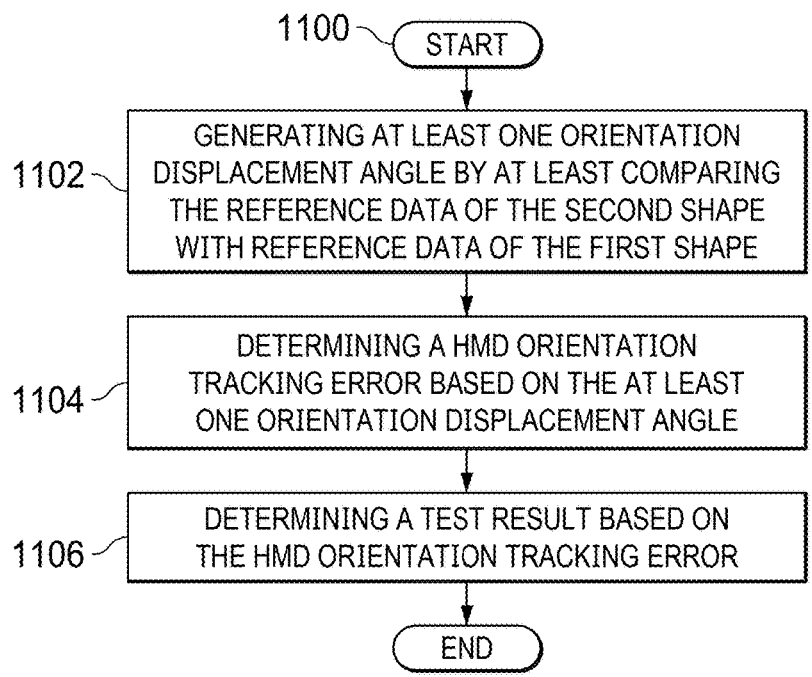
FIG. 11 illustrates a flowchart depicting operations of an example process for determining a HMD orientation tracking error, for example as part of an example process for performing at least one test of HMD viewpoint fidelity, in accordance with at least one aspect of the disclosure.

FIG. 11 illustrates a flowchart depicting operations of an example process for determining a HMD orientation tracking error, for example as part of an example process for performing at least one test of HMD viewpoint fidelity, in accordance with at least one aspect of the disclosure. Specifically, FIG. 11 depicts an example process 1100. In some embodiments, the process 1100 is performed by a simulation host system or an image generation system in communication with a head mounted device. For example, in some embodiments the process 1100 is performed by such devices alone, or in conjunction with one another, as depicted and described with respect to FIG. 1. In some embodiments, the process 1100 is performed in addition to, as part of, or in place of one or more operational blocks of the process 1000 as depicted and described in FIG. 10. For example, in some embodiments, the process 1100 is performed in addition to or as an alternative of the operation 1010 as depicted and described with respect to FIG. 10.

At operation 1102, the process 1100 includes generating at least one orientation displacement angle. The orientation displacement angle represents a rotation angle between a position of a first shape and a second shape in the virtual environment, such as based on coordinates representing positions of the at least one reference point. For example, in some embodiments, the orientation displacement angle is generated by at least comparing the reference data of the second shape with reference data of the first shape. In this regard, the reference data for each shape may include positions of the same type of reference point, such that the positions of a particular reference point may be compared to determine an angle of rotation between the positions associated with the reference point.

In some embodiments, the orientation displacement angle is one of a plurality of orientation displacement angle. For example, in some embodiments, the plurality of orientation displacement angles represent a series of orientation displacement angles associated with a plurality of times in a time series. Each time may correspond to a different excursion value. In this regard, each orientation displacement angle of the plurality of orientation displacement angles may be processed for a particular time, as discussed herein.

At operation 1104, the process 1100 includes determining a HMD orientation tracking error. In some embodiments, the HMD orientation tracking error is determined based on the at least one orientation displacement angle generated for the first shape and the second shape. In some embodiments, the HMD orientation tracking error represents a magnitude of the rotational angle as represented by the orientation displacement angle, for example in comparison to a test axis. In some embodiments, any other error determination formula may be used to determine the HMD orientation tracking error from the orientation displacement angle.

At operation 1106, the process 1100 includes determining a test result. The test result may be one of a test passed result or a test failed result. In some embodiments, the test result is determined based on the HMD orientation tracking error. For example, in some embodiments, the test result is determined by comparing the HMD orientation tracking error with at least one threshold. In some such embodiments, the test result is determined to be the test passed result in a circumstance where the HMD orientation tracking error does not exceed (or otherwise satisfies) the threshold. The test result is determined to be a test failed result in a circumstance where the HMD movement tracking error exceeds (or otherwise does not satisfy) the threshold. The threshold may be set by a user, automatically determined, predetermined, or otherwise set using an automatic or manual mechanism.

Additionally or alternatively, in some embodiments, the test result is determined based on data associated with multiple times of a time series. For example, in some embodiments, multiple HMD orientation tracking errors are determined based on multiple reference data portions corresponding to multiple times of a time series. A sub-test result may be determined for each time of the time series. The test result for the process 1100 may then be determined based on the combination of the sub-test results.

In some embodiments, the test result is output. For example in some embodiments, the test result is output via rendering to one or more displays, as discussed herein. In some embodiments, the test result is output as depicted and described with respect to operation 1016 in FIG. 10.

Figure 12:
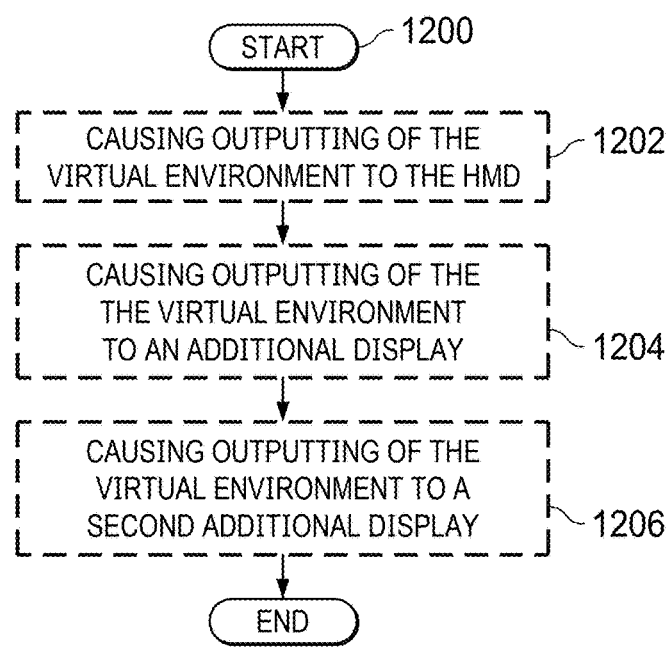
FIG. 12 illustrates a flowchart depicting operations of an example process for outputting a virtual environment to at least one display, for example as part of an example process for performing at least one test of HMD viewpoint fidelity, in accordance with at least one aspect of the disclosure.

FIG. 12 illustrates a flowchart depicting operations of an example process for outputting a virtual environment to at least one display, for example as part of an example process for performing at least one test of HMD viewpoint fidelity, in accordance with at least one aspect of the disclosure. Specifically, FIG. 12 depicts an example process 1200. In some embodiments, the process 1200 is performed by a simulation host system or an image generation system in communication with a head mounted device. For example, in some embodiments the process 1200 is performed by such devices alone, or in conjunction with one another, as depicted and described with respect to FIG. 1. In some embodiments, the process 1200 is performed as part of or in place of one or more operational blocks of the process 1000 as depicted and described in FIG. 10. For example, in some embodiments, the process 1200 is performed in place of the operation 1016 as depicted and described with respect to FIG. 10.

It should be appreciated that each of the operational blocks depicted and described with respect to FIG. 12 is optional. In this regard, any number of the operational blocks may be performed. For example, in some embodiments, only one of the blocks is performed as part of the process 1200. In other embodiments, all or any sub-combinations of the operational blocks may be performed as part of the process 1200.

At operation 1202, the process 1200 includes causing outputting of the virtual environment to the HMD. In this regard, a wearer of the HMD may view a particular virtual viewpoint of the virtual environment. In some embodiments, the virtual environment is rendered together with a test result, such that the shapes and associated test result is rendered within the virtual viewpoint of the virtual environment. The wearer of the HMD may be an operator of the simulation, or during a testing phase may not be utilized as the HMD is secured to the test stand.

At operation 1204, the process 1200 includes causing outputting of the virtual environment to an additional display. Additionally or alternatively, in some embodiments, the virtual environment is output to a display of a secondary system (e.g., a repeater system), such as a system separate from the HMD that similarly outputs at least the virtual viewpoint of the virtual environment. In some embodiments, the virtual environment is rendered together with a test result, such that the shapes and associated test result is rendered within the virtual viewpoint of the virtual environment. In this regard, a second user (e.g., a student of the simulation embodied in the virtual environment) may view the test result together with a rendering of the virtual viewpoint of the virtual environment.

At operation 1206, the process 1200 includes causing outputting of the virtual environment to a second additional display. In some embodiments, the test result is output to a display of a tertiary system (e.g., an instructor system), such as a system separate from the HMD and the secondary system and that similarly outputs at least the virtual viewpoint of the virtual environment. In some embodiments, the virtual environment is rendered together with a test result, such that the shapes and associated test result is rendered within the virtual viewpoint of the virtual environment. In this regard, a third user (e.g., an instructor of the simulation embodied in the virtual environment) may view the test result together with a rendering of the virtual viewpoint of the virtual environment.

In some embodiments, each display receives the same virtual viewpoint of the virtual environment for rendering, such that the displays depict the same visual elements. Each of the different systems having a display to output may have different control or ability to interact with the virtual environment. For example, some systems may have no control and merely receive and display data for output via rendering, and other systems (e.g., the HMD or optionally an instructor system as an additional display) may include one or more controls for interacting with the virtual environment.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a virtual environment configuration unit/module, a sensor device monitoring unit/module, a motion cue monitoring unit/module, a HMD monitoring unit/module, a virtual element updating unit/module, an error determination unit/module, or a test result determination unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:
    generating a virtual environment comprising at least a first shape and a second shape in a virtual viewpoint, wherein the first shape is in front of the second shape in the virtual viewpoint, the second shape is configured to adjust in the virtual viewpoint as the virtual viewpoint adjusts, the second shape is positioned in the virtual environment at a determined offset from the first shape along a test axis, and the first shape is affixed to the virtual viewpoint of the virtual environment, and the virtual viewpoint of the virtual environment is configured to adjust in response to movement of a head mounted display (HMD) on a test stand;

moving a position of the virtual viewpoint with respect to the second shape in response to the movement of the HMD on the test stand;

recording reference data associated with the moving of the position of the virtual viewpoint;

generating a positional displacement vector by at least comparing reference data of the second shape with reference data of the first shape; and determining a HMD movement tracking error based on the positional displacement vector.

2. The method according to claim 1, further comprising:
determining a test result based on the HMD movement tracking error; and
outputting the test result.

3. The method according to claim 2, further comprising:
determining that the HMD movement tracking error is within a threshold,
wherein the test result is a test successful result.

4. The method according to claim 3, wherein the threshold comprises 2 inches.

5. The method according to claim 2, further comprising:
detecting a test completion trigger, wherein determining the test result is in response to the detecting of the test completion trigger.

6. The method according to claim 1, further comprising:
generating at least one orientation displacement angle by at least comparing the reference data of the first shape with the reference data of the second shape; and
determining a HMD orientation tracking error based on the at least one orientation displacement angle.

7. The method according to claim 6, further comprising:
determining a test result based on the HMD orientation tracking error; and
outputting the test result.

8. The method according to claim 7, further comprising:
determining that the HMD orientation tracking error is within a threshold,
wherein the test result is a test successful result.

9. The method according to claim 8, wherein the threshold comprises 5 degrees.

10. The method according to claim 1, further comprising:
generating the virtual environment comprising a third shape that blocks at least a portion of the virtual environment from rendering in the virtual viewpoint.

11. The method according to claim 1, further comprising:
causing outputting of the virtual environment to an additional display.

12. The method according to claim 11, further comprising:
causing outputting of the virtual environment to a second additional display.

13. The method according to claim 1, wherein the first shape comprises a first circular shape with a first at least one cutout, and the second shape comprises a second circular shape with a second at least one cutout.

14. The method according to claim 1, further comprising:
for each additional test axis of at least one additional test axis:
moving the position of the virtual viewpoint with respect to the second shape in response to an additional movement of the HMD on the test stand along the additional test axis;

recording additional reference data associated with the additional moving of the position in the virtual viewpoint;

generating an additional positional displacement vector by at least comparing the additional reference data of the second shape with additional reference data of the first shape; and determining an additional HMD movement tracking error based on the additional positional displacement vector, wherein the additional HMD movement tracking error is associated with the additional test axis.

15. The method according to claim 1, wherein the test stand is fixedly moveable only along the test axis.

16. The method according to claim 1, wherein the first shape is of a first color and the second shape is of a second color, wherein the first color and the second color are visually distinguishable.

17. An apparatus comprising:
at least one processor; and
at least one non-transitory computer readable memory connected to the at least one processor and including computer program code, wherein the at least one non-transitory computer readable memory and the computer program code are configured, with the at least one processor, to cause the apparatus to:
generate a virtual environment comprising at least a first shape and a second shape in a virtual viewpoint, wherein the first shape is in front of the second shape in the virtual viewpoint, the second shape is configured to adjust in the virtual viewpoint as the virtual viewpoint adjusts, the second shape is positioned in the virtual environment at a determined offset from the first shape along a test axis, and the first shape is affixed to the virtual viewpoint of the virtual environment, and the virtual viewpoint of the virtual environment is configured to adjust in response to movement of a head mounted display (HMD) on a test stand;

move a position of the virtual viewpoint with respect to the second shape in response to the movement of the HMD on the test stand;

record reference data associated with the moving of the position of the virtual viewpoint;

generate a positional displacement vector by at least comparing reference data of the second shape to reference data of the first shape; and determine a HMD movement tracking error based on the positional displacement vector.

18. The apparatus according to claim 17, wherein the at least one non-transitory computer readable memory and the computer program code are configured, with the at least one processor, to further cause the apparatus to:
determine a test result; and
output the test result,
wherein to determine the test result, the computer program code cause the apparatus to:
determine the test result based on the HMD movement tracking error; or
determine the test result based on a HMD orientation tracking error based on at least one orientation displacement angle.

19. At least one non-transitory computer-readable storage medium having computer program instructions stored thereon that, when executed by at least one processor, causes the at least one processor to perform:

generating a virtual environment comprising at least a first shape and a second shape in a virtual viewpoint, wherein the first shape is in front of the second shape in the virtual viewpoint, the second shape is configured to adjust in the virtual viewpoint as the virtual viewpoint adjusts, the second shape is positioned in the virtual environment at a determined offset from the first shape along a test axis, and the first shape is affixed to the virtual viewpoint of the virtual environment, and the virtual viewpoint of the virtual environment is configured to adjust in response to movement of a head mounted display (HMD) on a test stand;

moving a position of the virtual viewpoint with respect to the second shape in response to the movement of the HMD on the test stand;

recording reference data associated with the moving of the position of the virtual viewpoint;

generating a positional displacement vector by at least comparing reference data of the second shape with reference data of the first shape; and determining a HMD movement tracking error based on the positional displacement vector.

20. The at least one non-transitory computer-readable storage medium according to claim 19, wherein the computer program instructions stored, when executed by at least one processor, further causes the at least one processor to perform:

determining the test result based on the HMD movement tracking error; or determining the test result based on a HMD orientation tracking error based on at least one orientation displacement angle.

\* \* \* \* \*